United States Patent
O'Keeffe et al.

(10) Patent No.: US 9,873,151 B2
(45) Date of Patent: Jan. 23, 2018

(54) HORIZONTAL SKULL MELT SHOT SLEEVE

(71) Applicant: Crucible Intellectual Property, LLC, Rancho Santa Margarita, CA (US)

(72) Inventors: Sean Timothy O'Keeffe, Tustin, CA (US); Adam A. Verreault, Rancho Santa Margarita, CA (US); Glenton Jelbert, Foothill Ranch, CA (US); Michael Deming, Trabuco Canyon, CA (US)

(73) Assignee: Crucible Intellectual Property, LLC, Rancho Santa Margarita, CA (US)

( * ) Notice: Subject to any disclaimer, the term of this patent is extended or adjusted under 35 U.S.C. 154(b) by 0 days.

(21) Appl. No.: 14/572,066

(22) Filed: Dec. 16, 2014

(65) Prior Publication Data
US 2016/0089715 A1   Mar. 31, 2016

Related U.S. Application Data

(60) Provisional application No. 62/056,128, filed on Sep. 26, 2014.

(51) Int. Cl.
*B22D 17/10* (2006.01)
*B22D 17/04* (2006.01)
(Continued)

(52) U.S. Cl.
CPC ........... *B22D 17/04* (2013.01); *B22D 17/203* (2013.01); *B22D 17/2023* (2013.01);
(Continued)

(58) Field of Classification Search
CPC ........ B22D 17/04; B22D 17/08; B22D 17/10; B22D 17/12; B22D 17/2023; B22D 17/203; B22D 17/2038; H05B 6/24; F27B 14/063
(Continued)

(56) References Cited

U.S. PATENT DOCUMENTS

| | | |
|---|---|---|
| 1,943,802 A | 1/1934 | Northrup |
| 3,014,255 A | 12/1961 | Bussard et al. |

(Continued)

FOREIGN PATENT DOCUMENTS

| | | |
|---|---|---|
| CA | 2010961 | 3/1997 |
| CN | 1355857 | 6/1986 |

(Continued)

OTHER PUBLICATIONS

International Search Report and Written Opinion dated Dec. 7, 2015, PCT/US2015/052222, 11 pages.

(Continued)

*Primary Examiner* — Kevin E Yoon
(74) *Attorney, Agent, or Firm* — Brownstein Hyatt Farber Schreck, LLP

(57) ABSTRACT

Disclosed are embodiments of a vessel configured to contain a secondary magnetic induction field therein for melting materials, and methods of use thereof. The vessel can be used in an injection molding apparatus having an induction coil positioned adjacent to the vessel. The vessel can have a tubular body configured to substantially surround and receive a plunger tip. Longitudinal slots or gaps extend through the thickness of the body to allow and/or direct eddy currents into the vessel during application of an RF induction field from the coil. The body also includes temperature regulating lines configured to flow a liquid within. The temperature regulating lines can be provided to run longitudinally within the wall(s) of the body between its inner bore and outer surface(s). A flange may be provided at one end of the body to secure the body within an injection molding apparatus.

14 Claims, 12 Drawing Sheets

(51) Int. Cl.
*H05B 6/36* (2006.01)
*H05B 6/44* (2006.01)
*B22D 17/20* (2006.01)
*B22D 17/28* (2006.01)
*B22D 41/01* (2006.01)
*B23H 7/02* (2006.01)
*C22C 45/00* (2006.01)
*B22D 25/06* (2006.01)
*C22C 1/00* (2006.01)
*C22C 33/00* (2006.01)
*C22C 45/02* (2006.01)
*C22C 45/10* (2006.01)

(52) U.S. Cl.
CPC ..... *B22D 17/2038* (2013.01); *B22D 17/2053* (2013.01); *B22D 17/28* (2013.01); *B22D 25/06* (2013.01); *B22D 41/01* (2013.01); *B23H 7/02* (2013.01); *C22C 1/002* (2013.01); *C22C 33/003* (2013.01); *C22C 45/00* (2013.01); *C22C 45/001* (2013.01); *C22C 45/003* (2013.01); *C22C 45/02* (2013.01); *C22C 45/10* (2013.01); *H05B 6/36* (2013.01); *H05B 6/367* (2013.01); *H05B 6/44* (2013.01)

(58) Field of Classification Search
USPC .......................................... 164/113, 303–318
See application file for complete search history.

(56) References Cited

U.S. PATENT DOCUMENTS

| | | |
|---|---|---|
| 3,671,029 A | 6/1972 | Kurlsson |
| 3,731,727 A | 5/1973 | Mitamura et al. |
| 3,793,468 A | 2/1974 | Akers |
| 3,857,696 A | 12/1974 | Aldersley |
| 4,040,845 A | 8/1977 | Richerson et al. |
| 4,049,384 A | 9/1977 | Wenckus et al. |
| 4,135,568 A | 1/1979 | Brooks |
| 4,254,933 A | 3/1981 | Netto |
| 4,265,294 A | 5/1981 | Gaule |
| 4,550,412 A | 10/1985 | Holcombe et al. |
| 4,612,973 A | 9/1986 | Whang |
| 4,678,024 A | 7/1987 | Hull |
| 4,693,299 A | 9/1987 | Kuznetsov et al. |
| 4,738,713 A | 4/1988 | Stickle |
| 4,799,532 A | 1/1989 | Mizuhara |
| 4,887,798 A | 12/1989 | Julius |
| 4,926,926 A * | 5/1990 | Zecman ............. B22D 17/2023 164/138 |
| 5,003,551 A | 3/1991 | Mortimer |
| 5,055,025 A | 10/1991 | Muller |
| 5,087,804 A | 2/1992 | McGaffigne |
| 5,288,344 A | 2/1994 | Peker et al. |
| 5,333,646 A | 8/1994 | Delot |
| 5,368,659 A | 11/1994 | Peker et al. |
| 5,487,421 A | 1/1996 | Gerber |
| 5,511,605 A | 4/1996 | Iwamoto |
| 5,579,825 A * | 12/1996 | Shibata ............. B22D 17/007 164/113 |
| 5,616,024 A | 4/1997 | Nobori |
| 5,618,359 A | 4/1997 | Lin et al. |
| 5,711,363 A | 1/1998 | Scruggs et al. |
| 5,718,280 A | 2/1998 | Matsuura et al. |
| 5,735,975 A | 4/1998 | Lin et al. |
| 5,896,642 A | 4/1999 | Peker |
| 5,976,247 A | 11/1999 | Hansen et al. |
| 5,979,534 A | 11/1999 | Shibata et al. |
| 6,021,840 A | 2/2000 | Colvin |
| 6,089,846 A | 7/2000 | Collet et al. |
| 6,189,600 B1 | 2/2001 | Taniguchi et al. |
| 6,210,478 B1 * | 4/2001 | Bewlay ................. C30B 13/00 117/37 |
| 6,267,170 B1 | 7/2001 | Onuki |
| 6,267,171 B1 | 7/2001 | Onuki |
| 6,283,197 B1 | 9/2001 | Kono |
| 6,325,868 B1 | 12/2001 | Kim et al. |
| 6,371,195 B1 | 4/2002 | Onuki |
| 6,427,753 B1 | 8/2002 | Inoue |
| 6,502,624 B1 | 1/2003 | Williams et al. |
| 6,695,035 B2 * | 2/2004 | Kimura ................. B22D 11/115 164/338.1 |
| 6,875,293 B2 | 4/2005 | Peker |
| 6,994,146 B2 | 2/2006 | Wang |
| 7,017,645 B2 | 3/2006 | Johnson et al. |
| 7,040,377 B2 | 6/2006 | Toyoshima et al. |
| 7,235,910 B2 | 6/2007 | Decristofaro et al. |
| 7,275,583 B2 | 10/2007 | Eisen |
| 7,366,395 B2 | 4/2008 | Yuasa et al. |
| 7,368,022 B2 | 5/2008 | Yim |
| 7,377,303 B2 | 5/2008 | Go |
| 7,488,170 B2 | 2/2009 | Yuasa et al. |
| 7,575,040 B2 | 8/2009 | Johnson |
| 7,618,499 B2 | 11/2009 | Johnson et al. |
| 7,708,844 B2 | 5/2010 | Muramatsu |
| 7,806,997 B2 | 10/2010 | Demetriou et al. |
| 7,906,219 B2 | 3/2011 | Ohara |
| 8,267,149 B2 * | 9/2012 | McCullough ........ B22D 17/007 164/113 |
| 8,298,354 B2 | 10/2012 | Hata et al. |
| 8,327,914 B2 | 12/2012 | Zheng et al. |
| 8,480,864 B2 | 7/2013 | Farmer et al. |
| 8,490,676 B2 * | 7/2013 | Shibata ................. B22C 9/082 164/113 |
| 8,529,712 B2 | 9/2013 | Demetriou et al. |
| 8,641,839 B2 | 2/2014 | Schroers et al. |
| 8,735,783 B2 | 5/2014 | Lovens et al. |
| 9,346,099 B2 | 5/2016 | Verreault et al. |
| 9,445,459 B2 | 9/2016 | Verreault et al. |
| 2002/0005233 A1 | 1/2002 | Schirra et al. |
| 2003/0201090 A1 | 10/2003 | Nanto et al. |
| 2004/0055726 A1 | 3/2004 | Hong et al. |
| 2005/0111518 A1 | 5/2005 | Roach et al. |
| 2006/0254747 A1 | 11/2006 | Ishida et al. |
| 2006/0278362 A1 | 12/2006 | Muramatsu et al. |
| 2006/0291529 A1 | 12/2006 | Haun et al. |
| 2007/0277953 A1 | 12/2007 | Ward et al. |
| 2008/0135136 A1 | 6/2008 | Demetriou et al. |
| 2008/0305387 A1 | 12/2008 | Murray et al. |
| 2009/0162629 A1 | 6/2009 | Demetriou et al. |
| 2009/0321037 A1 | 12/2009 | Lewis et al. |
| 2010/0230012 A1 | 9/2010 | Demetriou et al. |
| 2011/0079940 A1 | 4/2011 | Schroers et al. |
| 2011/0164650 A1 | 7/2011 | Chen et al. |
| 2012/0103262 A1 | 5/2012 | Seki et al. |
| 2012/0111522 A1 | 5/2012 | Bullied et al. |
| 2014/0093658 A1 | 4/2014 | Zhao et al. |
| 2014/0102661 A1 | 4/2014 | Waniuk et al. |
| 2014/0332176 A1 | 11/2014 | Waniuk et al. |
| 2016/0258688 A1 | 9/2016 | Verreault et al. |

FOREIGN PATENT DOCUMENTS

| | | |
|---|---|---|
| CN | 1202402 A | 12/1998 |
| CN | 1876277 A | 12/2006 |
| CN | 1887481 | 1/2007 |
| CN | 101166594 | 4/2008 |
| CN | 101487106 | 7/2009 |
| CN | 101642805 | 2/2010 |
| CN | 102527982 | 7/2012 |
| CN | 103722147 | 4/2014 |
| DE | 19902002 | 7/2000 |
| EP | 0845316 | 6/1998 |
| EP | 1013363 | 6/2000 |
| EP | 1415740 | 5/2004 |
| EP | 2450131 | 5/2012 |
| FR | 1508992 A1 | 1/1968 |
| FR | 2665654 | 2/1992 |
| GB | 392764 | 5/1933 |
| GB | 574914 | 1/1946 |
| GB | 784363 | 10/1957 |
| JP | 55036033 | 3/1980 |
| JP | S61119368 | 6/1986 |

(56) References Cited

FOREIGN PATENT DOCUMENTS

| | | |
|---|---|---|
| JP | H02070371 | 3/1990 |
| JP | 03067487 | 3/1991 |
| JP | H04162940 | 6/1992 |
| JP | 05131255 A | 5/1993 |
| JP | H05200513 | 8/1993 |
| JP | H0683888 A | 3/1994 |
| JP | H06114523 | 4/1994 |
| JP | 6212205 | 8/1994 |
| JP | 1994212205 | 8/1994 |
| JP | 8013111 | 1/1996 |
| JP | H08187566 A | 7/1996 |
| JP | H09155533 | 6/1997 |
| JP | 9272929 | 10/1997 |
| JP | 09272929 | 10/1997 |
| JP | H09323146 | 12/1997 |
| JP | A H10-009769 | 1/1998 |
| JP | H11-47902 | 2/1999 |
| JP | 2000024767 | 1/2000 |
| JP | A 2000119826 | 4/2000 |
| JP | 2000292071 | 10/2000 |
| JP | H10208860 | 10/2000 |
| JP | 2000326065 | 11/2000 |
| JP | 2001018053 | 1/2001 |
| JP | 2001071113 | 3/2001 |
| JP | 2001259821 | 9/2001 |
| JP | 2001303218 | 10/2001 |
| JP | 2002029727 | 1/2002 |
| JP | A 2002066707 | 3/2002 |
| JP | 2003336971 | 11/2003 |
| JP | 2004050269 | 2/2004 |
| JP | A 2005205422 | 8/2005 |
| JP | 2006122992 | 5/2006 |
| JP | 2006289466 | 10/2006 |
| JP | 2007083286 | 4/2007 |
| JP | A 2007209993 | 8/2007 |
| JP | 2008238264 | 10/2008 |
| JP | 2009068101 | 4/2009 |
| JP | A 2009139905 | 6/2009 |
| JP | 2009172627 | 8/2009 |
| JP | 2009173964 | 8/2009 |
| JP | 2010036210 | 2/2010 |
| JP | A 2010208223 | 9/2010 |
| JP | 2010241628 | 10/2010 |
| JP | A 2011147961 | 8/2011 |
| JP | 2014530762 | 11/2014 |
| KR | 1020010040915 | 5/2011 |
| WO | WO 00/037201 | 6/2000 |
| WO | WO 02/040727 | 5/2002 |
| WO | WO 05/004559 | 1/2005 |
| WO | WO 06/127792 | 11/2006 |
| WO | WO 08/046219 | 4/2008 |
| WO | WO 09/067512 | 5/2009 |
| WO | WO 10/108744 | 9/2010 |
| WO | WO 10/111701 | 9/2010 |
| WO | WO2013048429 | 3/2013 |
| WO | WO 13/055365 | 4/2013 |
| WO | WO 13/112130 | 8/2013 |
| WO | WO 2013112130 A1 * 8/2013 ............ B22D 41/01 |

OTHER PUBLICATIONS

Inoue et al., Bulk amorphous alloys with high mechanical strength and good soft magnetic properties in Fe-TM-B (TM=IV-VIII group transition metal) system, *Appl. Phys. Lett.*, 71 (4), 1977, pp. 464-466.

Inoue et al., "Microstructure and Properties of Bulky $Al_{84}Ni_{10}Ce_6$ Alloys with Amorphous Surface Layer Prepared by High-Pressure Die Casting," *Materials Transactions*, JIM, vol. 35, No. 11, 1994, pp. 808-813.

Kargahi et al., "Analysis of failure of conducting crucible used in induction metal," *elektrowarme international*, vol. 45, Aug. 1988, 12 pages.

Köhler, Etching in Microsystem Technology, John Wiley & Son Ltd., 1999, 7 pages.

McDeavitt et al., "High Temperature Interaction Behavior at Liquid Metal-Ceramic Interfaces," *Journal of Materials Engineering and Performance*, 2002, vol. 11, pp. 392-401.

Shen et al., Bulk Glassy $Co_{43}Fe_{20}Ta_{5.5}B_{31.5}$ Alloy with High Glass-Forming Ability and Good Soft Magnetic *Properties, Materials Transactions*, vol. 42, No. 10, 2001, pp. 2136-2139.

Walker et al., *CRC Handbook of Metal Etchants*, CRC Press, 1991, 15 pages.

Wolf et al., *Silicon Processing for the VLSI Era, vol. 1: Process Technology*, Lattice Press. 1986, 17 pages.

* cited by examiner

HORIZONTAL SKULL MELT SHOT SLEEVE

CROSS REFERENCE RELATED APPLICATION(S)

This application claims priority to U.S. Provisional Application No. 62/056,128, filed Sep. 26, 2014, which is hereby incorporated by reference in its entirety.

FIELD

The described embodiments relate generally to vessels used for melting materials. More particularly, the present embodiments relate to a slotted shot sleeve or vessel configured to utilize a magnetic field from an induction source to melt material.

BACKGROUND

Some injection molding machines use an induction coil to melt material in a boat before injecting the material into a mold. In horizontally disposed injecting molding machines, for example, material can be melted in a boat that is positioned for horizontal injection. Some machines have utilized a boat that is substantially U-shaped; that is, a boat that includes body with a base and side walls extending partially upwardly therefrom but that end around a midpoint or equator. This configuration results in a low-walled vessel design that resembles a partial portion (e.g., lower half) of a tube (as opposed to a fully enclosed, round tube) with an open top portion designed for exposure to a magnetic field from the induction coil in order to melt material therein. This low-walled boat design can reduce both boat and plunger tip life. Also, the U-shaped design is subject to molten metal to flow over its sides during melting or during plunging of the metal. Further, because the plunger tip is minimally captured on top, it has some play in the direction perpendicular to the bore, which can result in it digging into a lip of the walls or cutout region, causing wear. Poor control of a plunger-tip to boat wall gap can allow penetration of flash into a gap that is too large on the bottom or sides of the tip during injection. Also, metal flash can build up at an edge of the cutout region in such a U-shaped boat. The boat may be unstable and have a greater tendency to flex. Moreover, heating in a U-shaped boat utilizes primary and secondary fields from an induction coil; such boat designs can suffer from excessive heating at its top edges, causing the boat to expand and curve if cooling is insufficient.

In some skull melting machines, a vertically positioned concentrator-type cage melter, surrounded by an induction coil, can be used to melt materials. Skull melters may have a vertically enclosed tubular configuration, for example, or may have a number of segments or fingers positioned in a substantially circular or tubular configuration, having multiple slots or openings therebetween, connected to a solid bottom, for example. FIGS. 8, 9, and 10 show a cross-sectional side view, a top view, and a plan view of an exemplary skull melter, as known in the art. This type of skull melter can create a semi-levitated melt. The intense stirring generated by the magnetic field in the skull melter fuses any high melting temperature charge components and homogenizes the melt in both chemical composition and temperature. This can translate into faster melt down, better mold filling (for castings) and a higher quality product.

When melting materials in an injection molding system, uniform temperatures in ranges appropriate to the meltable material should be implemented and maintained in order to produce quality molded parts. Utilizing effective vessels during melting can improve such quality.

SUMMARY

A proposed solution according to embodiments herein for melting materials (e.g., metals or metal alloys) in a vessel that is configured to allow, receive, aid in receipt, utilize, and/or direct a magnetic field (e.g., from an induction coil) via multiple slots or gaps in the vessel to melt materials.

In one aspect of this disclosure there is provided a temperature regulated vessel for melting amorphous alloy in an injection molding machine. The vessel includes a substantially tubular body having a first end and a second end along a longitudinal direction; a plurality of longitudinal slots extending between the first end and the second end of the substantially tubular body in the longitudinal direction and through a complete thickness of the substantially tubular body; and one or more temperature regulating channels configured to flow a liquid within the substantially tubular body. The vessel is configured for use with an induction coil configured to melt amorphous alloy in the vessel. The plurality of longitudinal slots is configured to receive eddy currents within the vessel during application of an induction field by the induction coil. The substantially tubular body is configured to substantially contain a second magnetic field produced by the eddy currents from the induction field to melt the amorphous alloy during its application. The one or more temperature regulating channels are configured to regulate a temperature of the vessel during the application of the induction field.

Another aspect of this disclosure provides an apparatus. The apparatus includes a vessel having an inner bore configured to receive a meltable amorphous alloy material for melting therein; an induction coil configured to melt the meltable amorphous alloy material in the vessel positioned adjacent thereto; and a plunger rod with a tip configured to move relative to the vessel. The vessel further includes a plurality of longitudinal slots extending through a complete thickness of the vessel. Each longitudinal slot is configured to direct eddy currents into the inner bore during application of an induction field by the induction coil to aid in melting the meltable amorphous alloy material during its application. The tip of the plunger rod is configured to move into the inner bore of the vessel to contain the meltable amorphous alloy material within the vessel during the application of the induction field.

Yet another aspect provides a method for melting amorphous alloy. The method includes providing meltable amorphous alloy material in a vessel; operating a heat source provided adjacent to the vessel to form a molten amorphous alloy material, and regulating a temperature of the vessel during the operating of the heat source. The vessel includes a body and a plurality of slots extending through a complete thickness of the body. The body is configured to utilize a magnetic field from the heat source to the meltable amorphous alloy material within the vessel during the operating via allowance of eddy current into the body of the vessel through the plurality of slots. The vessel also includes one or more temperature regulating channels therein. The regulating includes flowing a fluid in the one or more temperature regulating channels.

Still yet another aspect provides a method for forming a vessel used to melt amorphous alloy material. The method includes forming a substantially tubular body of a vessel having a first end and a second end along a longitudinal direction and having an inner bore therein; forming one or more temperature regulating channels configured to flow a liquid within the substantially tubular body; and forming a plurality of longitudinal slots extending between the first end and the second end of the substantially tubular body in the longitudinal direction and through a complete thickness of the substantially tubular body. The forming of the plurality of longitudinal slots is formed by a wire electric discharge machining (EDM) process. The vessel is configured for use with an induction coil configured to melt a meltable amorphous alloy material in the vessel. The plurality of longitudinal slots is configured to receive eddy currents within the vessel during application of an induction field by the induction coil. The substantially tubular body is configured to substantially contain a second magnetic field produced by the eddy currents from the induction field to melt the meltable amorphous alloy material during its application. The one or more temperature regulating channels are configured to regulate a temperature of the vessel during the application of the induction field.

Other aspects and advantages of the present invention will become apparent from the following detailed description, the accompanying drawings, and the appended claims.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. Amorphous alloys have many superior properties than their crystalline counterparts. However, if the cooling rate is not sufficiently high, crystals may form inside the alloy during cooling, so that the benefits of the amorphous state can be lost. For example, one challenge with the fabrication of bulk amorphous alloy parts is partial crystallization of the parts due to either slow cooling or impurities in the raw alloy material. As a high degree of amorphicity (and, conversely, a low degree of crystallinity) is desirable in BMG parts, there is a need to develop methods for casting BMG parts having controlled amount of amorphicity.

Figure 1:
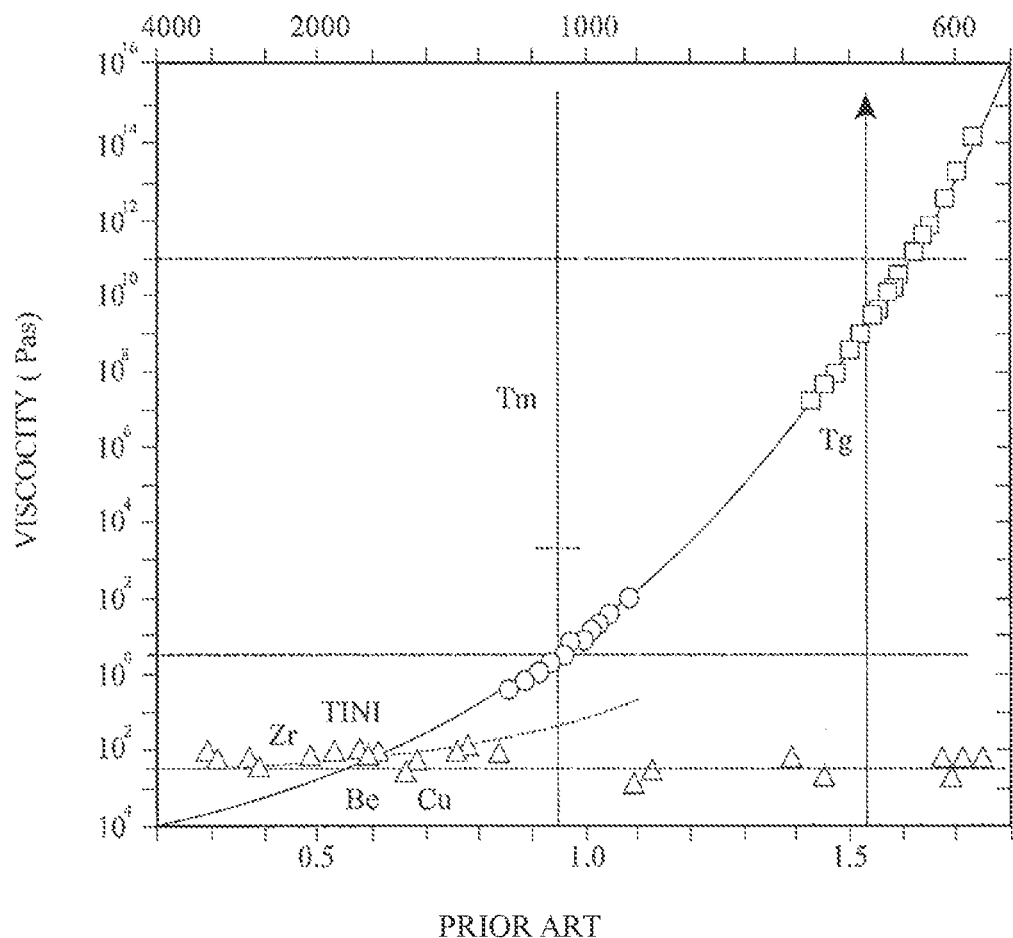
FIG. 1 provides a temperature-viscosity diagram of an exemplary bulk solidifying amorphous alloy.

FIG. 1 (obtained from U.S. Pat. No. 7,575,040) shows a viscosity-temperature graph of an exemplary bulk solidifying amorphous alloy, from the VIT-001 series of Zr—Ti—Ni—Cu—Be family manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 2:
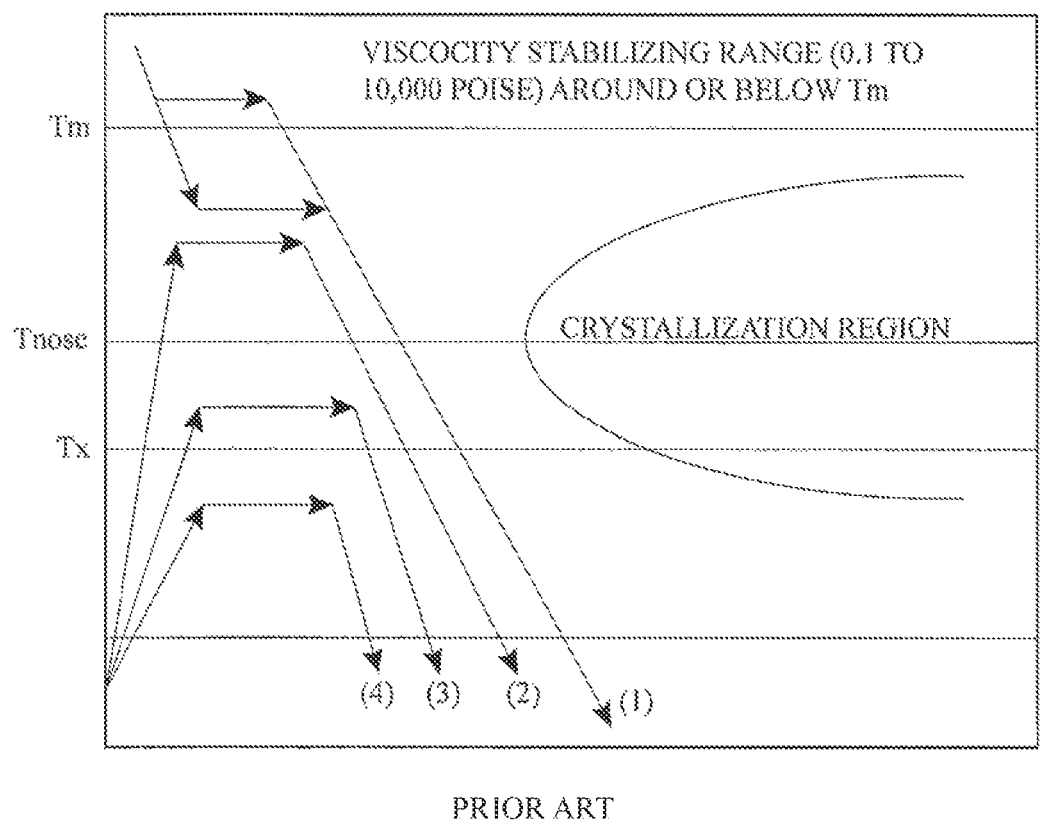
FIG. 2 provides a schematic of a time-temperature-transformation (TTT) diagram for an exemplary bulk solidifying amorphous alloy.

FIG. 2 (obtained from U.S. Pat. No. 7,575,040) shows the time-temperature-transformation (TTT) cooling curve of an exemplary bulk solidifying amorphous alloy, or TTT diagram. Bulk-solidifying amorphous metals do not experience a liquid/solid crystallization transformation upon cooling, as with conventional metals. Instead, the highly fluid, non crystalline form of the metal found at high temperatures (near a "melting temperature" Tm) becomes more viscous as the temperature is reduced (near to the glass transition temperature Tg), eventually taking on the outward physical properties of a conventional solid.

Even though there is no liquid/crystallization transformation for a bulk solidifying amorphous metal, a "melting temperature" Tm may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. A lower viscosity at the "melting temperature" would provide faster and complete filling of intricate portions of the shell/mold with a bulk solidifying amorphous metal for forming the BMG parts. Furthermore, the cooling rate of the molten metal to form a BMG part has to such that the time-temperature profile during cooling does not traverse through the nose-shaped region bounding the crystallized region in the TTT diagram of FIG. 2. In FIG. 2, Tnose is the critical crystallization temperature Tx where crystallization is most rapid and occurs in the shortest time scale.

The supercooled liquid region, the temperature region between Tg and Tx is a manifestation of the extraordinary stability against crystallization of bulk solidification alloys. In this temperature region the bulk solidifying alloy can exist as a high viscous liquid. The viscosity of the bulk solidifying alloy in the supercooled liquid region can vary between $10^{12}$ Pa s at the glass transition temperature down to $10^5$ Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

One needs to clarify something about Tx. Technically, the nose-shaped curve shown in the TTT diagram describes Tx as a function of temperature and time. Thus, regardless of the trajectory that one takes while heating or cooling a metal alloy, when one hits the TTT curve, one has reached Tx. In FIG. 2, Tx is shown as a dashed line as Tx can vary from close to Tm to close to Tg.

The schematic TTT diagram of FIG. 2 shows processing methods of die casting from at or above Tm to below Tg without the time-temperature trajectory (shown as (1) as an example trajectory) hitting the TTT curve. During die casting, the forming takes place substantially simultaneously with fast cooling to avoid the trajectory hitting the TTT curve. The processing methods for superplastic forming (SPF) from at or below Tg to below Tm without the time-temperature trajectory (shown as (2), (3) and (4) as example trajectories) hitting the TTT curve. In SPF, the amorphous BMG is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above Tnose or below Tnose, up to about Tm. If one heats up a piece of amorphous alloy but manages to avoid hitting the TTT curve, you have heated "between Tg and Tm", but one would have not reached Tx.

Typical differential scanning calorimeter (DSC) heating curves of bulk-solidifying amorphous alloys taken at a heating rate of 20 C/min describe, for the most part, a particular trajectory across the TTT data where one would likely see a Tg at a certain temperature, a Tx when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 2, then one could avoid the TTT curve entirely, and the DSC data would show a glass transition but no Tx upon heating. Another way to think about it is trajectories (2), (3) and (4) can fall anywhere in temperature between the nose of the TTT curve (and even above it) and the Tg line, as long as it does not hit the crystallization curve. That just means that the horizontal plateau in trajectories might get much shorter as one increases the processing temperature.

Phase

The term "phase" herein can refer to one that can be found in a thermodynamic phase diagram. A phase is a region of space (e.g., a thermodynamic system) throughout which all physical properties of a material are essentially uniform. Examples of physical properties include density, index of refraction, chemical composition and lattice periodicity. A simple description of a phase is a region of material that is chemically uniform, physically distinct, and/or mechanically separable. For example, in a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

Metal, Transition Metal, and Non-Metal

The term "metal" refers to an electropositive chemical element. The term "element" in this Specification refers generally to an element that can be found in a Periodic Table. Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal" refers to a chemical element that does not have the capacity to lose electrons and form a positive ion.

Depending on the application, any suitable nonmetal elements, or their combinations, can be used. The alloy (or "alloy composition") can comprise multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, O, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can comprise multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used.

The alloy sample or specimen can also be of a much larger dimension. For example, it can be a bulk structural component, such as an ingot, housing/casing of an electronic device or even a portion of a structural component that has dimensions in the millimeter, centimeter, or meter range.

Solid Solution

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

Alloy

In some embodiments, the alloy composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

Amorphous or Non-Crystalline Solid

An "amorphous" or "non-crystalline solid" is a solid that lacks lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The terms "order" and "disorder" designate the presence or absence of some symmetry or correlation in a many-particle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true, except, for example, in quasi-crystals that have perfectly deterministic tilings but do not possess lattice periodicity.

Long-range order characterizes physical systems in which remote portions of the same sample exhibit correlated behavior. This can be expressed as a correlation function, namely the spin-spin correlation function: $G(x,x') = \langle s(x), s(x') \rangle$.

In the above function, s is the spin quantum number and x is the distance function within the particular system. This function is equal to unity when $x=x'$ and decreases as the distance $|x-x'|$ increases. Typically, it decays exponentially to zero at large distances, and the system is considered to be disordered. If, however, the correlation function decays to a constant value at large $|x-x'|$, then the system can be said to possess long-range order. If it decays to zero as a power of the distance, then it can be called quasi-long-range order. Note that what constitutes a large value of $|x-x'|$ is relative.

A system can be said to present quenched disorder when some parameters defining its behavior are random variables that do not evolve with time (i.e., they are quenched or frozen)—e.g., spin glasses. It is opposite to annealed disorder, where the random variables are allowed to evolve themselves. Embodiments herein include systems comprising quenched disorder.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or "crystallinity" for short in some embodiments) of an alloy can refer to the amount of the crystalline phase present in the alloy. The degree can refer to, for example, a fraction of crystals present in the alloy. The fraction can refer to volume fraction or weight fraction, depending on the context. A measure of how "amorphous" an amorphous alloy is can be amorphicity. Amorphicity can be measured in terms of a degree of crystallinity. For example, in one embodiment, an alloy having a low degree of crystallinity can be said to have a high degree of amorphicity. In one embodiment, for example, an alloy having 60 vol % crystalline phase can have a 40 vol % amorphous phase.

Amorphous Alloy or Amorphous Metal

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared.

Amorphous metals can be produced through a variety of quick-cooling methods. For instance, amorphous metals can be produced by sputtering molten metal onto a spinning metal disk. The rapid cooling, on the order of millions of degrees a second, can be too fast for crystals to form, and the material is thus "locked in" a glassy state. Also, amorphous metals/alloys can be produced with critical cooling rates low enough to allow formation of amorphous structures in thick layers—e.g., bulk metallic glasses.

The terms "bulk metallic glass" ("BMG"), bulk amorphous alloy ("BAA"), and bulk solidifying amorphous alloy are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metals can be an alloy rather than a pure metal. The alloys may contain atoms of significantly different sizes, leading to low free volume (and therefore having viscosity up to orders of magnitude higher than other metals and alloys) in a molten state. The viscosity prevents the atoms from moving enough to form an ordered lattice. The material structure may result in low shrinkage during cooling and resistance to plastic deformation. The absence of grain boundaries, the weak spots of crystalline materials in some cases, may, for example, lead to better resistance to wear and corrosion. In one embodiment, amorphous metals, while technically glasses, may also be much tougher and less brittle than oxide glasses and ceramics.

Thermal conductivity of amorphous materials may be lower than that of their crystalline counterparts. To achieve formation of an amorphous structure even during slower cooling, the alloy may be made of three or more components, leading to complex crystal units with higher potential energy and lower probability of formation. The formation of amorphous alloy can depend on several factors: the composition of the components of the alloy; the atomic radius of the components (preferably with a significant difference of over 12% to achieve high packing density and low free volume); and the negative heat of mixing the combination of components, inhibiting crystal nucleation and prolonging the time the molten metal stays in a supercooled state. However, as the formation of an amorphous alloy is based on many different variables, it can be difficult to make a prior determination of whether an alloy composition would form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which can have none of the defects (such as dislocations) that limit the strength of crystalline alloys. For example, one modern amorphous metal, known as Vitreloy™, has a tensile strength that is almost twice that of high-grade titanium. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used. Alternatively, a BMG low in element(s) that tend to cause embitterment (e.g., Ni) can be used. For example, a Ni-free BMG can be used to improve the ductility of the BMG.

Another useful property of bulk amorphous alloys is that they can be true glasses; in other words, they can soften and flow upon heating. This can allow for easy processing, such as by injection molding, in much the same way as polymers. As a result, amorphous alloys can be used for making sports equipment, medical devices, electronic components and equipment, and thin films. Thin films of amorphous metals can be deposited as protective coatings via a high velocity oxygen fuel technique.

A material can have an amorphous phase, a crystalline phase, or both. The amorphous and crystalline phases can have the same chemical composition and differ only in the microstructure—i.e., one amorphous and the other crystalline. Microstructure in one embodiment refers to the structure of a material as revealed by a microscope at 25× magnification or higher. Alternatively, the two phases can have different chemical compositions and microstructures. For example, a composition can be partially amorphous, substantially amorphous, or completely amorphous.

As described above, the degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. A substance that is uniform in composition is homogeneous. This is in contrast to a substance that is heterogeneous. The term "composition" refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically comprises a substantially uniformly distributed amorphous alloy throughout the composition. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or a different chemical composition. In one embodiment, they have substantially the same chemical composition. In another embodiment, the crystalline phase can be more ductile than the BMG phase.

The methods described herein can be applicable to any type of amorphous alloy. Similarly, the amorphous alloy described herein as a constituent of a composition or article can be of any type. The amorphous alloy can comprise the element Zr, Hf, Ti, Cu, Ni, Pt, Pd, Fe, Mg, Au, La, Ag, Al, Mo, Nb, Be, or combinations thereof. Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt %, such as at least about 40 wt %, such as at least about 50 wt %, such as at least about 60 wt %, such as at least about 80 wt %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

For example, the amorphous alloy can have the formula $(Zr, Ti)_a(Ni, Cu, Fe)_b(Be, Al, Si, B)_c$, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula $(Zr, Ti)_a(Ni, Cu)_b(Be)_c$, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula $(Zr, Ti)_a(Ni, Cu)_b(Be)_c$, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula $(Zr)_a(Nb, Ti)_b(Ni, Cu)_c(Al)_d$, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One exemplary embodiment of the aforedescribed alloy system is a Zr—Ti—Ni—Cu—Be based amorphous alloy under the trade name Vitreloy™, such as Vitreloy-1 and Vitreloy-101, as fabricated by Liquidmetal Technologies, CA, USA. Some examples of amorphous alloys of the different systems are provided in Table 1 and Table 2.

TABLE 1

| Exemplary amorphous alloy compositions | | | | | | | |
| --- | --- | --- | --- | --- | --- | --- | --- |
| Alloy | Atm % | Atm % | Atm % | Atm % | Atm % | Atm % | Atm % | Atm % |
| 1 | Fe | Mo | Ni | Cr | P | C | B | |
| | 68.00% | 5.00% | 5.00% | 2.00% | 12.50% | 5.00% | 2.50% | |
| 2 | Fe | Mo | Ni | Cr | P | C | B | Si |
| | 68.00% | 5.00% | 5.00% | 2.00% | 11.00% | 5.00% | 2.50% | 1.50% |

TABLE 1-continued

Exemplary amorphous alloy compositions

| Alloy | Atm % | Atm % | Atm % | Atm % | Atm % | Atm % | Atm % | Atm % |
|---|---|---|---|---|---|---|---|---|
| 3 | Pd 44.48% | Cu 32.35% | Co 4.05% | P 19.11% | | | | |
| 4 | Pd 77.50% | Ag 6.00% | Si 9.00% | P 7.50% | | | | |
| 5 | Pd 79.00% | Ag 3.50% | Si 9.50% | P 6.00% | Ge 2.00% | | | |
| 5 | Pt 74.70% | Cu 1.50% | Ag 0.30% | P 18.0% | B 4.00% | Si 1.50% | | |

TABLE 2

Additional Exemplary amorphous alloy compositions (atomic %)

| Alloy | Atm % | Atm % | Atm % | Atm % | Atm % | Atm % |
|---|---|---|---|---|---|---|
| 1 | Zr 41.20% | Ti 13.80% | Cu 12.50% | Ni 10.00% | Be 22.50% | |
| 2 | Zr 44.00% | Ti 11.00% | Cu 10.00% | Ni 10.00% | Be 25.00% | |
| 3 | Zr 56.25% | Ti 11.25% | Cu 6.88% | Ni 5.63% | Nb 7.50% | Be 12.50% |
| 4 | Zr 64.75% | Ti 5.60% | Cu 14.90% | Ni 11.15% | Al 2.60% | Be 1.00% |
| 5 | Zr 52.50% | Ti 5.00% | Cu 17.90% | Ni 14.60% | Al 10.00% | |
| 6 | Zr 57.00% | Nb 5.00% | Cu 15.40% | Ni 12.60% | Al 10.00% | |
| 7 | Zr 50.75% | Cu 36.23% | Ni 4.03% | Al 9.00% | | |
| 8 | Zr 46.75% | Ti 8.25% | Cu 7.50% | Ni 10.00% | Be 27.50% | |
| 9 | Zr 21.67% | Ti 43.33% | Ni 7.50% | Be 27.50% | | |
| 10 | Zr 35.00% | Ti 30.00% | Cu 7.50% | Be 27.50% | | |
| 11 | Zr 35.00% | Ti 30.00% | Co 6.00% | Be 29.00% | | |
| 12 | Zr 35.00% | Ti 30.00% | Fe 2.00% | Be 33.00% | | |
| 13 | Au 49.00% | Ag 5.50% | Pd 2.30% | Cu 26.90% | Si 16.30% | |
| 14 | Au 50.90% | Ag 3.00% | Pd 2.30% | Cu 27.80% | Si 16.00% | |
| 15 | Pt 57.50% | Cu 14.70% | Ni 5.30% | P 22.50% | | |
| 16 | Zr 36.60% | Ti 31.40% | Nb 7.00% | Cu 5.90% | Be 19.10% | |
| 17 | Zr 38.30% | Ti 32.90% | Nb 7.30% | Cu 6.20% | Be 15.30% | |
| 18 | Zr 39.60% | Ti 33.90% | Nb 7.60% | Cu 6.40% | Be 12.50% | |
| 19 | Cu 47.00% | Ti 34.00% | Zr 11.00% | Ni 8.00% | | |
| 20 | Zr 55.00% | Co 25.00% | Al 20.00% | | | |

Other exemplary ferrous metal-based alloys include compositions such as those disclosed in U.S. Patent Application Publication Nos. 2007/0079907 and 2008/0118387. These compositions include the Fe(Mn, Co, Ni, Cu) (C, Si, B, P, Al) system, wherein the Fe content is from 60 to 75 atomic percentage, the total of (Mn, Co, Ni, Cu) is in the range of from 5 to 25 atomic percentage, and the total of (C, Si, B, P, Al) is in the range of from 8 to 20 atomic percentage, as well as the exemplary composition Fe48Cr15Mo14Y2C15B6. They also include the alloy systems described by Fe—Cr—Mo—(Y,Ln)-C—B, Co—Cr—Mo-Ln-C—B, Fe—Mn—Cr—Mo—(Y,Ln)-C—B, (Fe, Cr, Co)—(Mo,Mn)—(C,B)—Y, Fe—(Co,Ni)—(Zr,Nb,Ta)—(Mo,W)—B, Fe—(Al,Ga)—(P,C,B,Si,Ge), Fe—(Co,Cr,Mo, Ga,Sb)—P—B—C, (Fe, Co)—B—Si—Nb alloys, and Fe—(Cr—Mo)—(C,B)—Tm, where Ln denotes a lanthanide element and Tm denotes a transition metal element. Furthermore, the amorphous alloy can also be one of the exemplary compositions Fe80P12.5C5B2.5, Fe80P11C5B2.5Si1.5, Fe74.5Mo5.5P12.5C5B2.5, Fe74.5Mo5.5P11C5B2.5Si1.5, Fe70Mo5Ni5P12.5C5B2.5, Fe70Mo5Ni5P11C5B2.5Si1.5, Fe68Mo5Ni5Cr2P12.5C5B2.5, and Fe68Mo5Ni5Cr2P11C5B2.5Si1.5, described in U.S. Patent Application Publication No. 2010/0300148.

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., Mater. Trans., JIM, Volume 42, p 2136 (2001), and Japanese Patent Application No. 200126277 (Pub. No. 2001303218 A). One exemplary composition is $Fe_{72}Al_5Ga_2P_{11}C_6B_4$. Another example is $Fe_{72}Al_7Zr_{10}Mo_5W_2B_{15}$. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

The aforedescribed amorphous alloy systems can further include additional elements, such as additional transition metal elements, including Nb, Cr, V, and Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

In some embodiments, a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the alloy sample/composition consists essentially of the amorphous alloy (with only a small incidental amount of impurities). In another embodiment, the composition includes the amorphous alloy (with no observable trace of impurities).

In one embodiment, the final parts exceeded the critical casting thickness of the bulk solidifying amorphous alloys.

In embodiments herein, the existence of a supercooled liquid region in which the bulk-solidifying amorphous alloy can exist as a high viscous liquid allows for superplastic forming. Large plastic deformations can be obtained. The ability to undergo large plastic deformation in the supercooled liquid region is used for the forming and/or cutting process. As oppose to solids, the liquid bulk solidifying alloy deforms locally which drastically lowers the required energy for cutting and forming. The ease of cutting and forming depends on the temperature of the alloy, the mold, and the cutting tool. As higher is the temperature, the lower is the viscosity, and consequently easier is the cutting and forming.

Embodiments herein can utilize a thermoplastic-forming process with amorphous alloys carried out between Tg and Tx, for example. Herein, Tx and Tg are determined from standard DSC measurements at typical heating rates (e.g. 20° C./min) as the onset of crystallization temperature and the onset of glass transition temperature.

The amorphous alloy components can have the critical casting thickness and the final part can have thickness that is thicker than the critical casting thickness. Moreover, the time and temperature of the heating and shaping operation is selected such that the elastic strain limit of the amorphous alloy could be substantially preserved to be not less than 1.0%, and preferably not being less than 1.5%. In the context of the embodiments herein, temperatures around glass transition means the forming temperatures can be below glass transition, at or around glass transition, and above glass transition temperature, but preferably at temperatures below the crystallization temperature $T_X$. The cooling step is carried out at rates similar to the heating rates at the heating step, and preferably at rates greater than the heating rates at the heating step. The cooling step is also achieved preferably while the forming and shaping loads are still maintained.

Electronic Devices

The embodiments herein can be valuable in the fabrication of electronic devices using a BMG. An electronic device herein can refer to any electronic device known in the art. For example, it can be a telephone, such as a cell phone, and a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including a portable DVD player, conventional DVD player, Blu-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock.

According to embodiments herein, a vessel for melting materials (e.g., metals or metal alloys) is provided that is configured to receive, direct, allow receipt of, and/or utilize a magnetic field (e.g., from an induction coil) to melt materials by way of slots or gaps formed through the body of the vessel. Further, embodiments herein disclose an injection molding apparatus or machine with a secondary field concentrator vessel, and a method of use of vessels as disclosed in the exemplary embodiments herein.

In accordance with various embodiments, there is provided a temperature regulated vessel. The vessel includes a substantially tubular body having a first end and a second end along a longitudinal direction; a plurality of longitudinal slots extending between the first end and the second end of the substantially tubular body in the longitudinal direction and through a complete thickness of the substantially tubular body; and one or more temperature regulating channels configured to flow a liquid within the substantially tubular body. The vessel is configured for use with a horizontally positioned induction coil configured to melt a meltable material in the vessel. The plurality of longitudinal slots is configured to receive eddy currents within the vessel during application of an induction field by the induction coil. The substantially tubular body is configured to substantially contain a second magnetic field produced by the eddy currents from the induction field to melt the meltable material during its application. The one or more temperature regulating channels are configured to regulate a temperature of the vessel during the application of the induction field.

In accordance with various embodiments, there is provided an apparatus. The apparatus includes a vessel having an inner bore configured to receive a meltable material for melting therein; an induction coil configured to melt the meltable material in the vessel positioned adjacent thereto; and a plunger rod with a tip configured to move relative to the vessel. The vessel further includes a plurality of longitudinal slots extending through a complete thickness of the vessel. Each longitudinal slot is configured to direct eddy currents into the inner bore during application of an induction field by the induction coil to aid in melting the meltable material during its application. The tip of the plunger rod is configured to move into the inner bore of the vessel to contain the meltable material within the vessel during the application of the induction field.

In accordance with various embodiments, there is provided a method. The method includes providing meltable material in a vessel; operating a heat source provided adjacent to the vessel to form a molten material, and regulating a temperature of the vessel during the operating of the heat source. The vessel includes a body and a plurality of slots extending through a complete thickness of the body. The body is configured to utilize a magnetic field from the heat source to the meltable material within the vessel during the operating via allowance of eddy current into the body of the vessel through the plurality of slots. The vessel also includes one or more temperature regulating channels therein. The regulating includes flowing a fluid in the one or more temperature regulating channels.

In accordance with various embodiments, there is provided a method. The method includes forming a substantially tubular body of a vessel having a first end and a second end along a longitudinal direction and having an inner bore therein; forming one or more temperature regulating channels configured to flow a liquid within the substantially tubular body; and forming a plurality of longitudinal slots extending between the first end and the second end of the substantially tubular body in the longitudinal direction and through a complete thickness of the substantially tubular body. The forming of the plurality of longitudinal slots is formed by a wire electric discharge machining (EDM) process. The vessel is configured for use with a horizontally positioned induction coil configured to melt a meltable material in the vessel. The plurality of longitudinal slots is configured to receive eddy currents within the vessel during application of an induction field by the induction coil. The substantially tubular body is configured to substantially contain a second magnetic field produced by the eddy currents from the induction field to melt the meltable material during its application. The one or more temperature regulating channels are configured to regulate a temperature of the vessel during the application of the induction field.

Also, in accordance with embodiments, the material for melting comprises a BMG feedstock, and a BMG part may be formed.

These and other embodiments are discussed below with reference to FIGS. 1-12. However, those skilled in the art will readily appreciate that the detailed description given herein with respect to these Figures is for explanatory purposes only and should not be construed as limiting.

The methods, techniques, and devices illustrated herein are not intended to be limited to the illustrated embodiments. As disclosed herein, an apparatus or a system (or a device or a machine) is configured to perform melting of and injection molding of material(s), such as amorphous alloys. The apparatus is configured to process such materials or alloys by melting at higher melting temperatures before injecting the molten material into a mold for molding. As further described below, parts of the apparatus are positioned in-line with each other. In accordance with some embodiments, parts of the apparatus (or access thereto) are aligned on a horizontal axis. The following embodiments are for illustrative purposes only and are not meant to be limiting.

Figure 3:
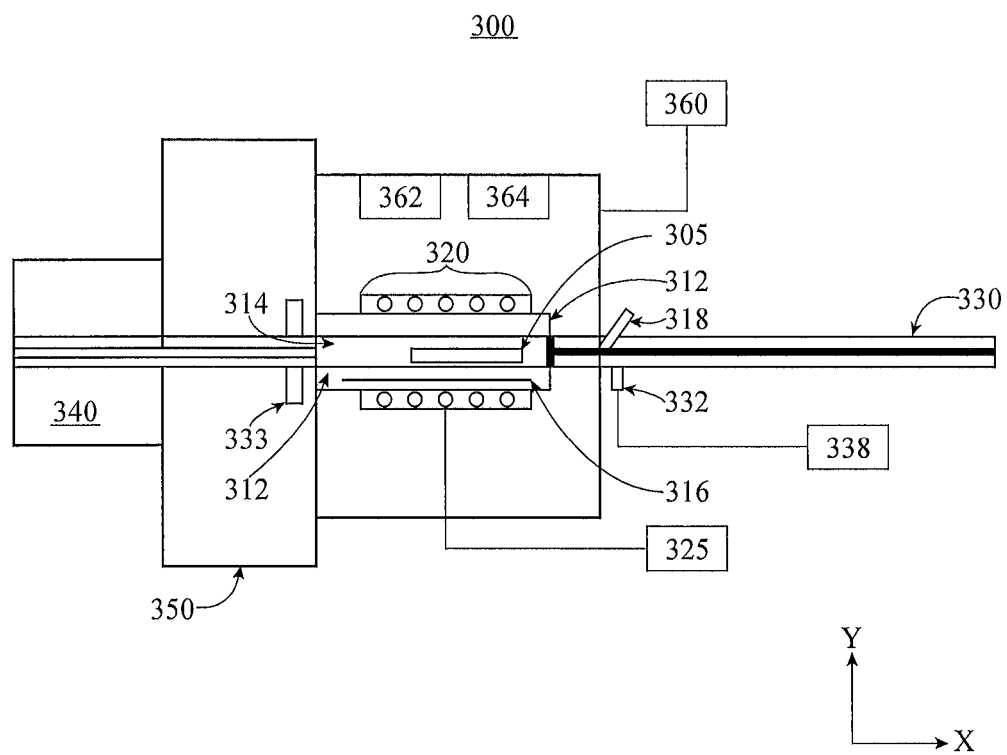
FIG. 3 shows a schematic diagram of an exemplary injection molding system/apparatus in accordance with various embodiments of the present teachings.

FIG. 3 illustrates a schematic diagram of such an exemplary apparatus. More specifically, FIG. 3 illustrates an injection molding system 300, apparatus, or machine. In accordance with an embodiment, injection molding system 300 can include a melt zone with an induction coil 320 configured to melt meltable material 305 received therein, and at least one plunger rod 330 configured to eject molten material 305 from the melt zone and into a mold 340. In an embodiment, at least plunger rod 330 and the melt zone are provided in-line and on a horizontal axis (e.g., X axis), such that plunger rod 330 is moved in a horizontal direction (e.g., along the X-axis) substantially through the melt zone to move the molten material 305 into mold 340. However, the horizontal movement and/or positioning of the plunger rod 330 is not intended to be limiting, as the rod and/or one or more parts of the system 300 may be positioned for alternate angular or vertical movement, for example. The mold can be positioned adjacent to the melt zone.

Melt zone 310 includes a melting mechanism configured to receive meltable material and to hold the material as it is heated to a molten state. The melting mechanism may be in the form of a vessel 312, for example, that has a body for receiving meltable material and configured to melt the material therein. Vessel 312 may have an inlet for inputting material (e.g., feedstock) into a receiving or melting portion 314 of its body. The body of the vessel has a length and can extend in a longitudinal and horizontal direction, as shown in FIG. 3, for example, such that molten material is removed horizontally therefrom using plunger 330. The material for heating or melting may be received in a melting portion 314 of the vessel 312. In an embodiment, the material received by the vessel 312 is an amorphous alloy. Melting portion 314 is configured to receive meltable material to be melted therein within the melt zone of the apparatus. For example, melting portion 314 has a surface for receiving material.

A vessel as used throughout this disclosure is a container or body made of a material employed for heating substances to high temperatures. The vessel also acts as a shot sleeve for moving molten material towards a mold. It should be understood that the terms "shot sleeve" and "vessel" may be used interchangeably throughout this disclosure with reference to a device for receiving meltable material (e.g., BMG) and containing such material during melting when heat from a heat source or a field is applied to melt the meltable material in the vessel. The device can allow for movement of the molten material after a melting process into a mold. Additionally, the vessel 312 can be an induction field concentrator. That is, vessel 312 is designed and configured to locally concentrate a magnetic field (e.g., a secondary field resulting from induction source 320, or another heat source) to promote a reaction and thus melting of a material provided within the vessel 312.

In an embodiment, vessel 312 is a cold hearth melting device that is configured to be utilized for meltable material(s) while under a vacuum (e.g., applied by a vacuum device or pump at a vacuum port 332).

In an embodiment, vessel 312 is coated with a [more] electrically conductive material [e.g., as compared to an electrically conductive material it is made of] to improve the eddy current propagation (current density) in the vessel, which can thereby increase an intensity of the magnetic field in the melt region/adjacent the induction coil 320, and can thereby increase the temperature and possibly thermal homogeneity of the molten alloy.

In an embodiment, vessel 312 is 'tuned' to resonate electromagnetically at a particular RF frequency so that loss of RF energy is minimized, thereby improving the efficiency of the vessel and system.

In an embodiment, a body of the vessel and/or its melting portion 314 may include substantially rounded and/or smooth surfaces. For example, a surface of melting portion 314 may be formed in an arcuate, a round, or a circular shape. However, the shape and/or surfaces of the body are not meant to be limiting. The body may be an integral structure, or formed from separate parts that are joined or machined together.

In the illustrated embodiment, the body of vessel 312 is configured to receive the plunger rod 330 therethrough in a horizontal direction to move the molten material. Alternatively, the body of the vessel 312 and plunger rod 330 may be positioned vertically or at another angle that allows for movement of the plunger rod 330 relative to (and into or through) the vessel 312. That is, in an embodiment, the melting mechanism, e.g., vessel 312, is on the same axis as the plunger rod, and the body can be configured and/or sized to receive at least part of the plunger rod, e.g., the plunger tip, to substantially cover or enclose [at least the tip of] the plunger rod 330 as it moves into and/or through the body (in either direction). Thus, plunger rod 330 can be configured to move molten material (after heating/melting) from the vessel by moving substantially through vessel 312, and pushing or forcing molten material into a mold 340. Referencing the illustrated embodiment of apparatus 300 in FIG. 3, for example, plunger rod 330 would move in a horizontal direction from the right towards the left, through vessel 312, moving and pushing the molten material towards and into mold 340.

By substantially enclosing at least the tip of the plunger within the vessel, the plunger tip can be used to block the induction field at an end of the vessel (e.g., in front of the plunger tip). This can reduce the efficiency of melting in front of it, which can have some benefit for containment of the molten material, depending upon the arrangement of the induction coil (e.g., if using an unevenly spaced induction coil), since molten material travels from areas of strong field to those of weaker field. The molten material tends to move and suck up against the plunger tip, where the induction field can be generally less. Furthermore, since the tip of the plunger is almost entirely enclosed or captured within the vessel on almost all of its sides, plunger tip and boat wear can be significantly reduced. Moreover, capturing of the plunger tip by the vessel (using inner bore) allows or permits, at most, minimal play of the tip. This allows for a more uniform and controlled gap between the tip and the inner bore/shot sleeve. With such a controlled gap, flash cannot penetrate the gap and blow by the tip during injection. The reduction in flash by the herein disclosed vessel reduces plunger tip and vessel wear, which is the principle wear mechanism of both components, eventually causing failure.

The vessel acts to relay the magnetic field, rather than act as a shield, via one or more slot(s) provided therein. As current passes through the induction coil/source, a magnetic field is generated and emitted within the coil. This magnetic field within the coil generates currents within the vessel (eddy currents) which are able to circulate in the inner bore (inner surface) of the vessel because of one or more slots in the vessel body. The eddy currents in the inner bore generate another (second) magnetic field inside the bore, and this (second) magnetic field generates a current in any meltable material (e.g., ingot) which is inside the bore. Accordingly, the current in the meltable material heats it up, and causes it to melt via joule heating. As explained further below, the wall(s) of the herein disclosed vessel 312, such as exemplary vessel as shown in FIGS. 4-7, still allow the material to melt, by utilizing and/or receiving eddy currents into the bore of the vessel via its slots or gaps during application of an induction field to melt the meltable material in the body. The RF current from the induction coil is increased within the vessel during heating and melting, resulting in more efficient coupling for melting the meltable material. Additionally, with the (high) walls of the vessel, molten material cannot splash or flow over the sides of vessel during melting or during injection. The only exit for the molten metal is down the inner bore (shot sleeve), which is prevented by the coil while powered or other gating mechanism, or through the top-slot (which is unlikely). Further, the disclosed design of the vessel 312 is very strong and does not and cannot flex.

To heat melt zone 310 and melt the meltable material received in vessel 312, injection apparatus 300 also includes a heat source that is used to heat and melt the meltable material. At least melting portion 314 of the vessel, if not substantially the entire body itself, is configured to be heated such that the material received therein is melted. Heating is accomplished using, for example, an induction source 320 positioned within melt zone 310 that is configured to melt the meltable material. In an embodiment, induction source 320 is positioned adjacent vessel 312. For example, induction source 320 may be in the form of a coil positioned in a helical manner substantially around a length of the vessel body. However, other configurations or patterns that are configured to melt material within the vessel 312 can be used. As such, vessel 312 may be configured to inductively melt a meltable material (e.g., an inserted ingot 305) within melting portion 314 by supplying a magnetic field to the meltable material resulting from power being applied induction source/coil 320, using a power supply or source 325. Thus, the melt zone can include an induction zone. Induction coil 320 is configured to heat up and melt any material that is contained by vessel 312 without melting and wetting vessel 312. Induction coil 320 emits radiofrequency (RF) waves towards vessel 312 which generates a magnetic field for melting the material therein. As shown, the body and coil 320 surrounding vessel 312 may be configured for positioning in a horizontal direction along a horizontal axis (e.g., X axis). In an embodiment, the induction coil 320 is positioned in a horizontal configuration such that its turns are positioned around and adjacent the vessel 312.

Figure 11:
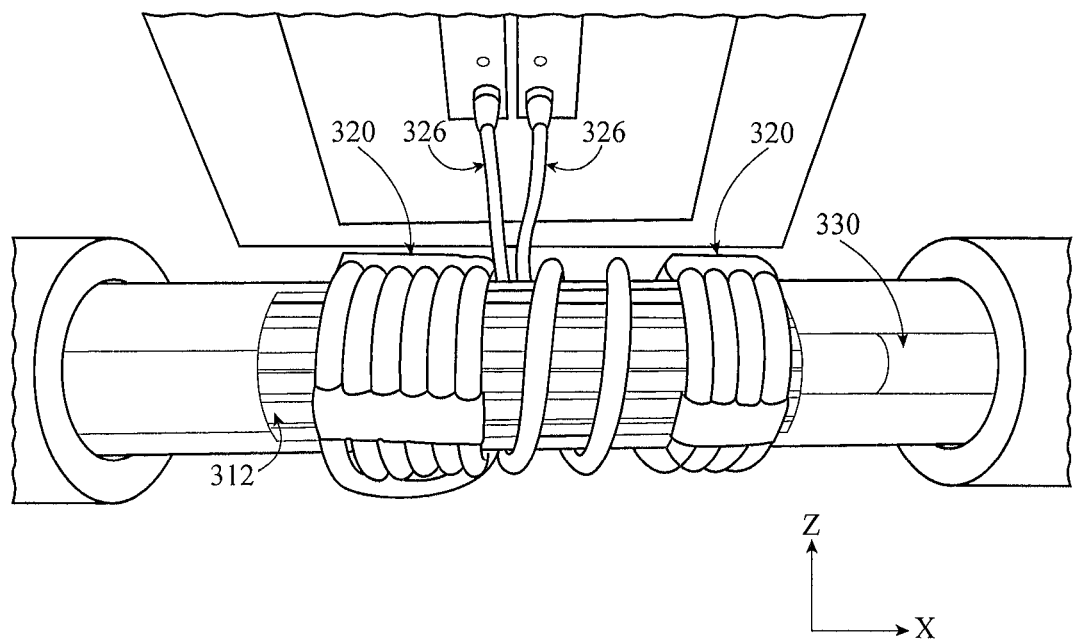
FIG. 11 illustrates a detailed, overhead view of the vessel of FIG. 4 in an injection molding apparatus with a surrounding induction coil in accordance with an embodiment of this disclosure.
Figure 12:
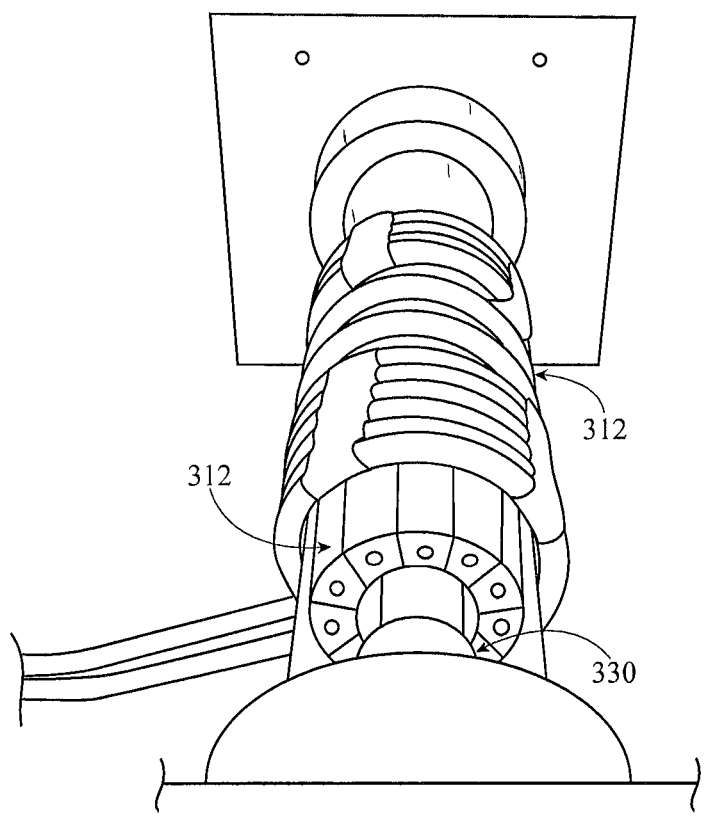
FIG. 12 illustrates an end perspective view of the vessel and surrounding induction coil of FIG. 11.

In an embodiment, the induction coil 320 has unevenly spaced turns of the coil adjacent and along a length of the vessel 312. FIGS. 11-12 illustrate examples of unevenly spaced induction coils configured for use in an injection molding apparatus. The induction coil 320 can include a load induction coil and a containment induction coil that are spaced from each other. The spaced turns or parts of the coil can be part of a single coil which operates at a same frequency throughout, or can be separate coils that are configured to operate at different frequencies, for example. Such a coil can be used in cooperation with the plunger to melt material in the vessel.

In an embodiment, described further below, the vessel 312 is a temperature regulated vessel. Because there eddy currents (second magnetic field) circulating in the inner bore/inner surfaces of the vessel during application of an induction field, the body of the vessel itself is subject to melting. As such, tempering or cooling of the vessel 312 allows for its utilization before, during, and after melting of meltable material without damaging its body. Such a vessel 312 may include one or more temperature regulating channels 316 or cooling lines configured to flow a gas, a fluid, or a liquid (e.g., water, oil, or other fluid) therein for regulating a temperature of the body of vessel 312 during, for example, melting of material in the vessel (e.g., to force cool the vessel). Such a force-cooled vessel can also be provided on the same axis as the plunger rod 330. The channel(s) 316 assist in preventing excessive heating and melting of the body of the vessel 312 itself during application of the induction field (e.g., from induction coil 320). Regulating channel(s) 316 may be connected to a cooling system 360 configured to induce flow of a gas or a liquid in the vessel. The regulating channel(s) 316 may include one or more inlets and outlets for the fluid to flow there-through. An inlet and an outlet can be connected to one or more of the temperature regulating channels design to flow the fluid in, through, and out of the body. The inlets and outlets of the channels 316 may be configured in any number of ways and are not meant to be limited. For example, channel(s) 316 may be positioned relative to melting portion 314 such that material thereon is melted and the vessel temperature is regulated (i.e., heat is absorbed, and the vessel is cooled). Regulating channel(s) 316 can be provided within the body of the vessel between an inner surface of its inner bore and its outer surface, and/or extending between a first end and a second end of its body (as shown and described in FIGS. 4-7, for example). The number, positioning, shape, and/or direction of the regulating channel(s) should not be limited. The activation or application of cooling fluid through the channel(s) is also not limited. The cooling liquid or fluid may be configured to flow through the regulating channel(s) during melting of the meltable material, after melting of the meltable material, when induction source 320 is powered, during a period of time power is supplied to the induction source, during application of the induction field, when the induction source 320 is off, or at any interval desired or necessary to regulate the temperature of the vessel to a desired (e.g., lesser) regulated temperature. Channels may be considered input channels and output channels. The number of input channels in the vessel can, but need not be, the same as the number of output channels.

One embodiment of a vessel 312 having the features described above that can be used with injection molding apparatus 300 is shown in FIGS. 4-7. That is, although not necessarily repeated in the description below, it should be understood that the description previously provided with regards to features associated with a vessel 312 can apply to the below-described embodiments, and vice versa.

Figure 4:
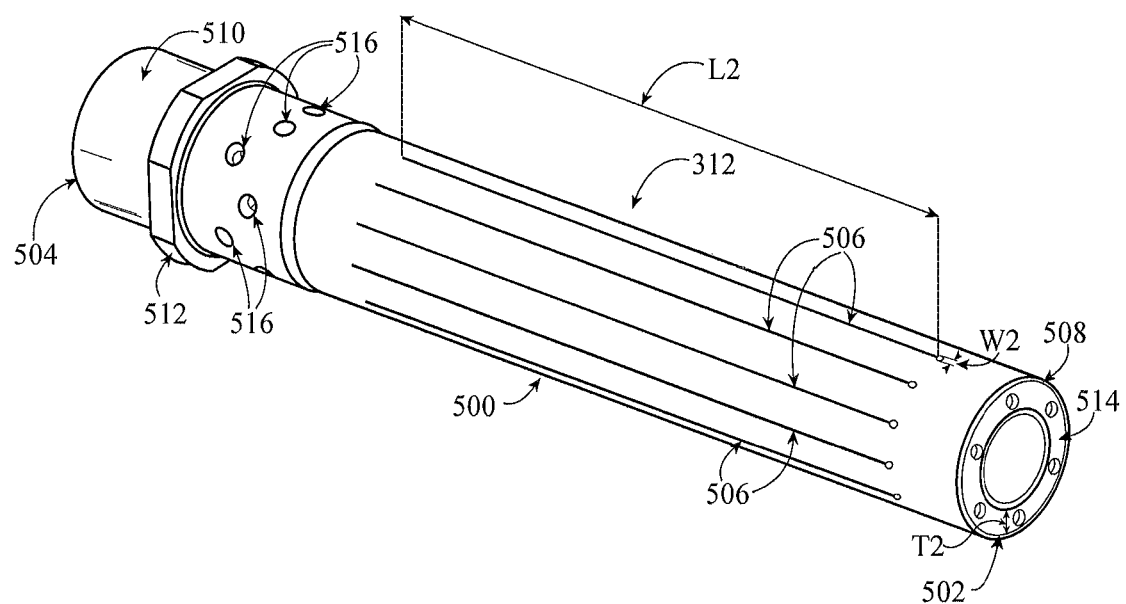
FIG. 4 illustrates a plan view of a vessel in accordance with an embodiment of this disclosure.

FIG. 4 illustrates an embodiment of a vessel 312 having a substantially tubular body 500, or "body 500" as referred to herein, for meltable material to be melted therein. In an embodiment, the body 500 of the vessel has a substantially tubular structure with a first end 502 (e.g., a front or plunger insertion end) and a second end 504 (e.g., a back or injection end) along a longitudinal direction. The body 500 has an inner surface 508 and an outer surface 510. The body 500 can be configured for positioning along a horizontal axis for use in an injection apparatus with a horizontally positioned induction coil 320, for example, in accordance with an embodiment.

In general, the body 500 has a melting portion 511 therein that is configured to receive meltable material for melting by a magnetic field from an induction coil, such as induction coil 320, provided adjacent to the vessel. The body 500 can have an inner bore 513 that acts as its melting portion and is configured to receive a meltable material for melting therein. The inner bore 513 may include inner surface 508 that extends between the first end 502 and the second end 504 of the body. The vessel also includes multiple slots 506 or gaps extending between the first end 502 and the second end 504 and through the body from the outer surface 510 to part of the surface 508 forming the inner bore 513. The induction coil produces a magnetic field that is directed via its slot towards and into an interior of its substantially tubular structure that is approximately constant throughout the volume and is directed along the axis of the coil (e.g., inwardly and horizontally). Also, rather than just being a crucible for melting material, the vessel 312 such as shown in FIG. 4 is used as a shot sleeve for injecting molten material into a mold. In accordance with an embodiment, the substantially tubular structure of the body 500 can include a wall or walls for substantially enclosing a plunger tip. By substantially enclosing the plunger, the RF current from the induction coil is increased within the body 500 during heating and melting, resulting in more efficient coupling for melting the meltable material. The vessel acts to relay the magnetic field, rather than act as a shield. As such, the wall(s) of the vessel as shown in FIG. 4 still allow the material to melt, by generating a secondary magnetic field inside the boat from current driven through the induction coil. Furthermore, since the tip of the plunger is almost entirely enclosed or captured within the vessel on almost all of its sides, plunger tip and boat wear can be significantly reduced.

The surfaces and walls of the body can be any shape. The wall(s) of the body 500 can be substantially circular. The wall of the body 500 has an inner surface 508 and an outer surface 510. The wall can have a thickness T2 that essentially separates the inner surface 508 and the outer surface 510. In an embodiment, the melting portion is at least part of the inner surface 508 (e.g., a bottom part and/or sides thereof). The inner surface 508 forms a receiving opening or bore through the substantially tubular body 500. In addition to receiving the meltable material for melting, the inner surface 508 is configured to receive a plunger (such as plunger 330) in and therethrough for moving molten material, as previously noted.

In an embodiment, the body 500 may have substantially rounded and/or smooth surfaces. For example, the inner surface 508 of bore may be formed in a substantially circular, arcuate, or round shape (schematically shown in FIG. 4, for example). Outer surface 510 can be formed in a similar shape or a different shape as inner wall 508, for example. In an embodiment, the inner surface 508 of the bore can be formed in a shape and with dimensions or sizes that correspond to the plunger 330 and its tip so that the body 500 is configured to substantially enclose the plunger tip 330 as it is moved through. However, the shape and/or surfaces of the body 500 are not meant to be limiting.

Figure 5:
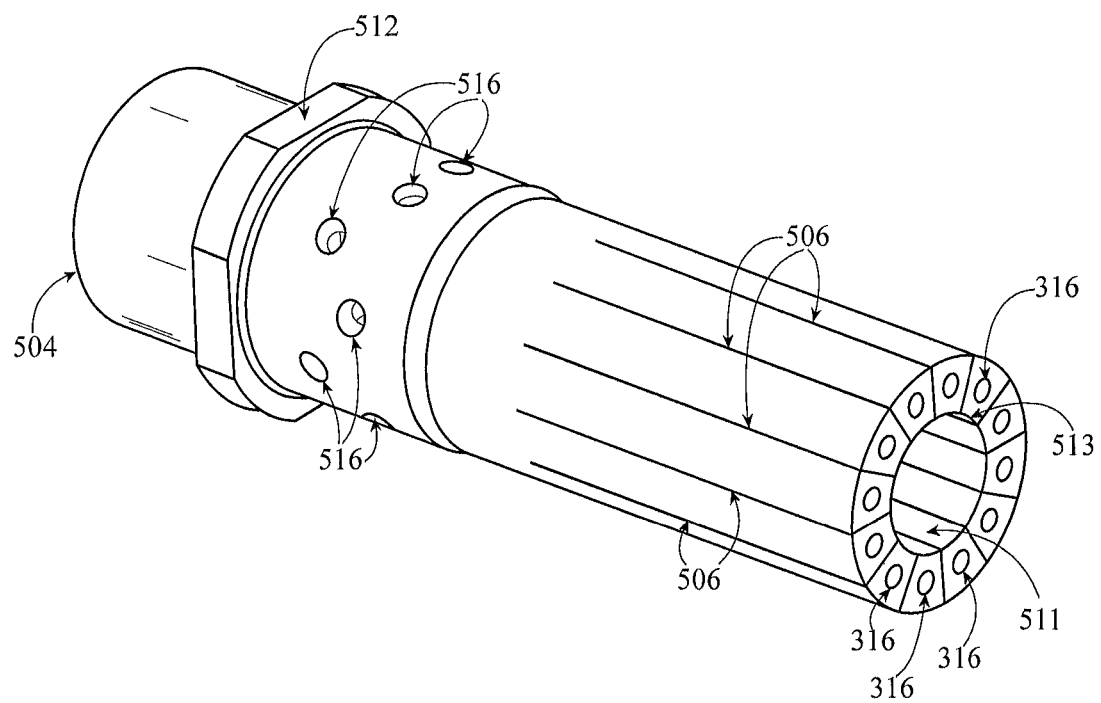
FIG. 5 illustrates a cross sectional view taken along line 5-5 of the vessel of FIG. 4.
Figure 6:
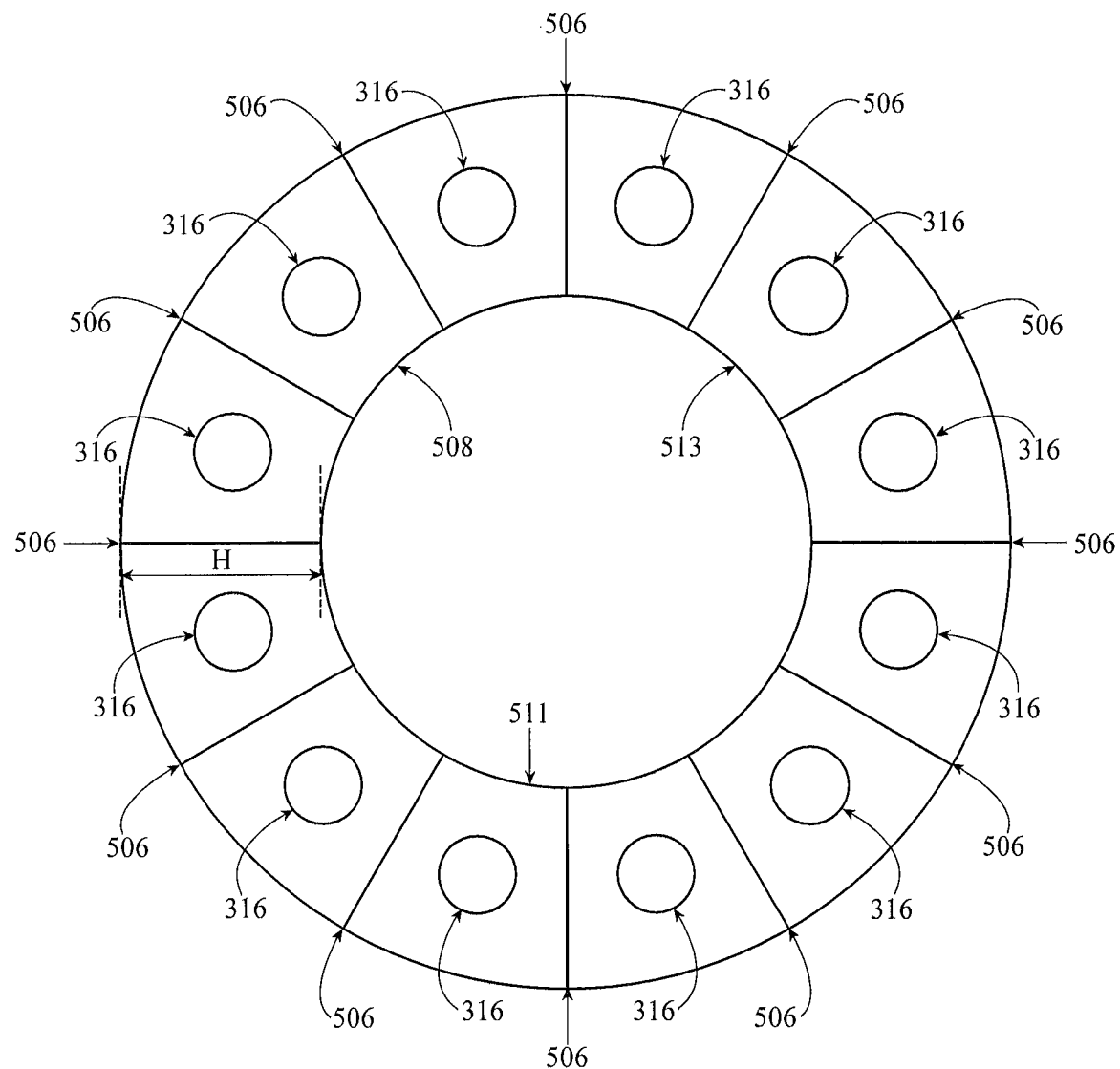
FIG. 6 illustrates an end view of the cross section of FIG. 5.

The vessel shown in FIG. 4 also has one or more temperature regulating lines (or cooling channels) 316, as seen in FIGS. 5 and 6, within its body 500 that are configured to allow for a flow of a liquid (e.g., water, or other fluid) therein for assisting in regulating a temperature of the vessel body during an induction field/melting process. Regulating line(s) 316 can be positioned within the body 500 relative to the melting portion or inner surface 508. For example, in an embodiment, channel(s) 316 may be positioned in a longitudinal direction relative to the body 500. In other embodiments, the channel(s) 316 may be positioned in a horizontal or lateral direction. In an embodiment, the one or more temperature regulating lines 316 are provided between the inner wall 508 (or surface of the inner bore) and the outer wall 510. The one or more temperature regulating channels 316 can extend between ends of the body 500. The one or more temperature regulating lines 316 can extend longitudinally parallel to the horizontal axis between the first end 502 and the second end 504 of the body 500. The body 500 can include channels running through a portion, area, or thickness of the wall, between the inner and outer surfaces 508 and 510.

Figure 7:
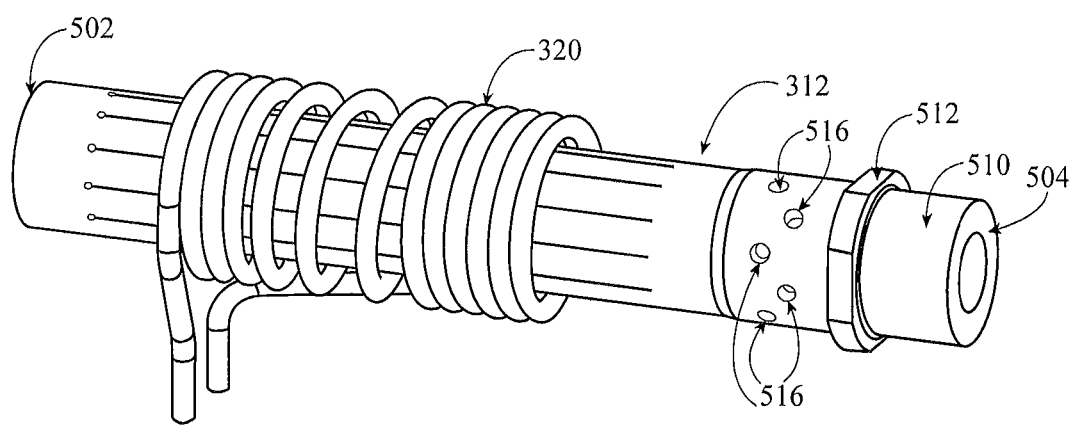
FIG. 7 illustrates a plan view of the vessel of FIG. 4 with a surrounding induction coil as used in a horizontal injection molding apparatus in accordance with an embodiment of this disclosure.
Figure 8:
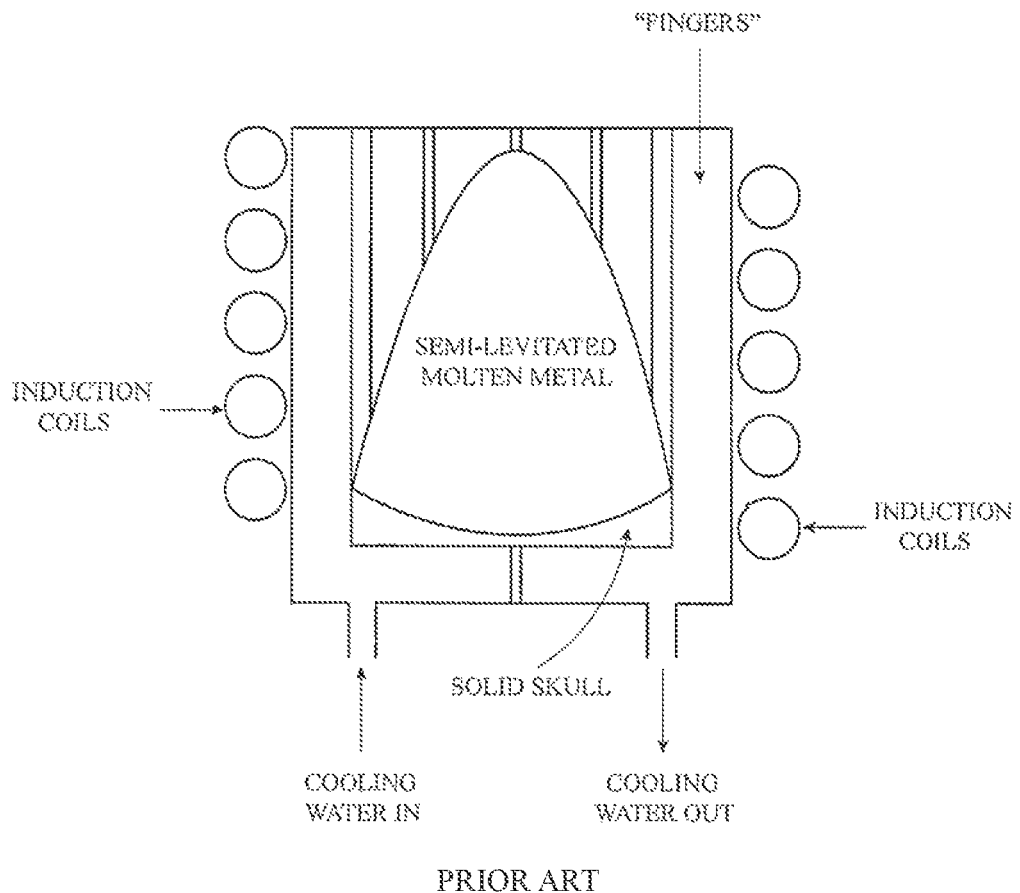
FIGS. 8, 9, and 10 illustrate a cross sectional view, an overhead view, and a plan view of an example of a prior art skull melting vessel in a vertical configuration.
Figure 9:
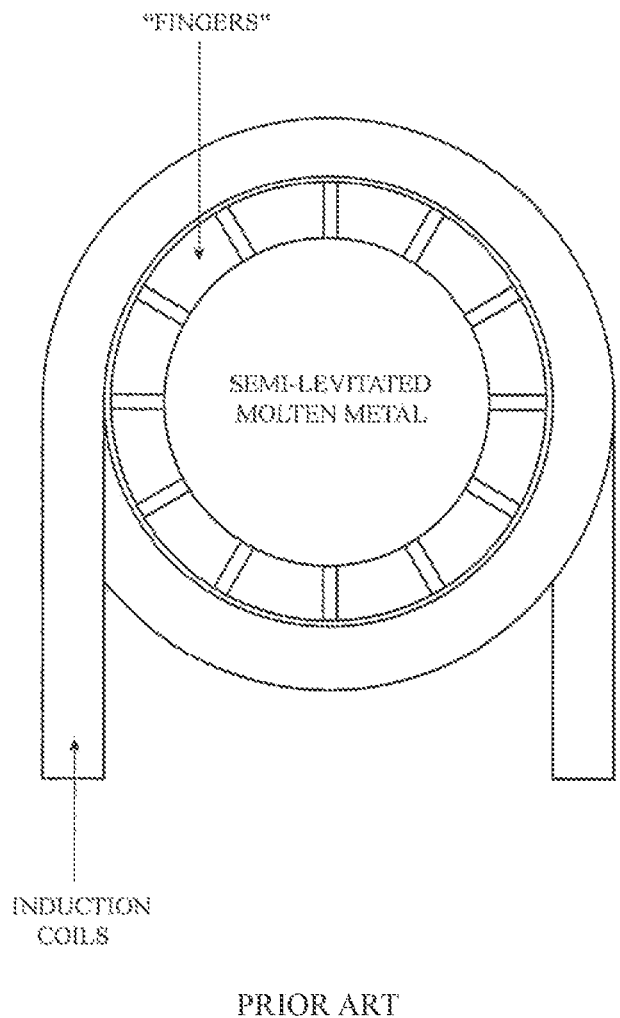
Figure 10:
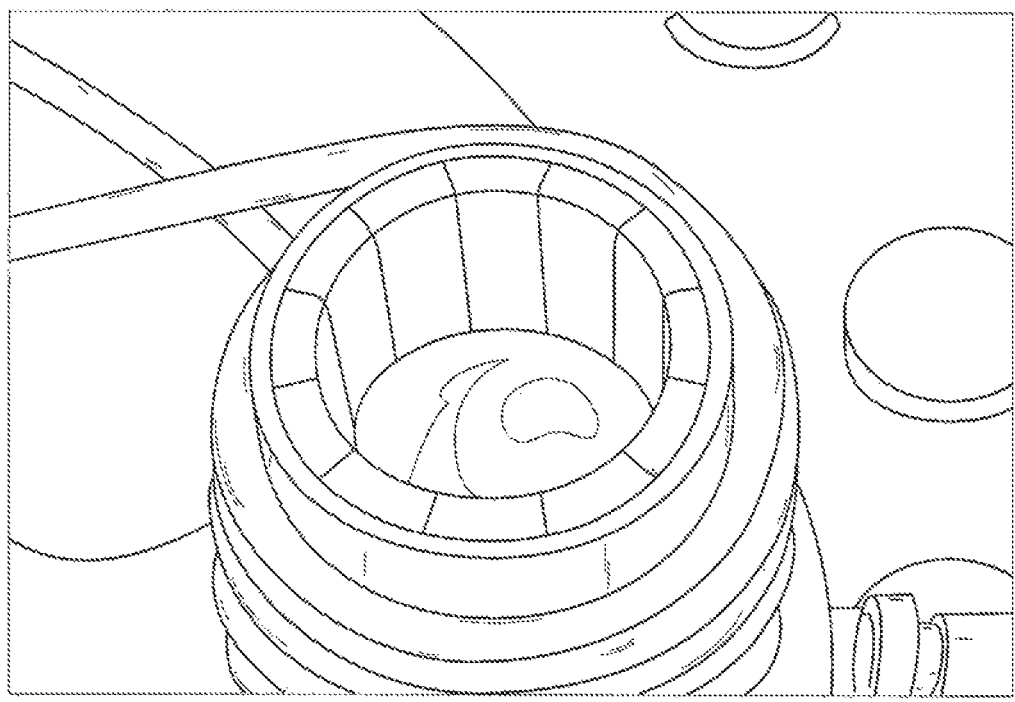

The regulating channel(s) 316 may include one or more inlets and outlets—both generally represented as 516 on body 500 in FIGS. 4, 5, and 7—for the liquid or fluid to flow into, therethrough, and out of the vessel. As shown in FIG. 5, the inlets and outlets 516 can be provided adjacent the second end 504 of the body 500. The inlets and outlet 516 can be slots or openings provided around the perimeter of the body 500. The inlets and outlets 516 are configured to communicate with a cooling system to input and output a cooling fluid or liquid. In an embodiment, the inlets and outlets 516 are offset or staggered relative to one another. For example, the inlets may be provided in a first area, and the outlets may be provided on a second area. The inlets and outlets 516 of the regulating channels may be configured in any number of ways and are not meant to be limited. Further, a direction of flow of fluid or liquid within the channel(s) is not limiting. For example, in an embodiment, the fluid may be configured to enter and exit each channel such that the liquid flows in one direction. In another embodiment, the liquid may be configured to flow in alternate directions, e.g., each adjacent line may include an alternating entrance and exit. The fluid or liquid can be configured to flow into one or more inlets or entrances, and then longitudinally along a first side of the body 500, for example, and flow longitudinally along a second side of the body 500 in an opposite direction, in each of the channels, and out of one or more outlets or exits. The direction of flow within each channel need not be the same. In addition, the regulating channels may be configured to have one or more entrances/exits that are configured to allow flow of the liquid between the channels. For example, in an embodiment wherein a vessel has longitudinally extending regulating channels, one or more of the channels may include one or more lateral or extending line(s) that extend to another channel(s) or line(s) such that they are fluidly joined to each other. That is, the liquid can be configured to not only run longitudinally along the body, but also through and between connected channel(s).

In an embodiment, the channels are provided in a spaced configuration between the walls 508 and 510. In an embodiment, the channels are equidistantly spaced relative to one another around the body 500, such as shown in FIG. 6. In an embodiment, the direction of flow of fluid or liquid in the channels alternates in every other channel. In an embodiment, inlet channels and outlet channels alternate around the body. In an embodiment, at least a bottom part of the vessel body includes channels that are relatively closer with regards to their relative spacing. Channels can be provided above a mid-portion or equator of the vessel in accordance with an embodiment.

The number, shape, positioning, flow within, and/or direction of the regulating channels in the vessel as shown in FIGS. 4-7, as well as the location of the inlets and outlets of such channels in body 500, should not be limited. Also, the size (e.g., diameter or width) of the regulating channels is not limited. The size of the channels may be based on the number of regulating channels included in the body, for example, or the size of the segment or material the channels are provided in (e.g., based on a thickness of a surface, such as the thickness of the body). The size of the regulating channels may also be based on an amount of desired cooling.

As shown, the body 500 includes two or more longitudinal slots 506, or "slots 506" as referred to herein. The slots 506 extend between the first end 502 and the second end 504 and through a complete thickness T2 of the substantially tubular body 500 at its top, for example. The slots 506 can extend through the body from the outer surface 510 to part of the inner surface 508 forming the bore. The slots 506 provide a gap or opening within the wall of the vessel. The slots 506 are configured to utilize and/or receive eddy currents within the body 500 of the vessel during application of an RF induction field. If the wall(s) of the vessel were fully closed during application of RF power from the induction source, any eddy currents that are formed can propagate in undesirable directions, e.g., not towards a meltable material. Because eddy currents produce the field which melts the meltable material/ingot within the vessel, it is desirable to obtain control over them to direct their field and currents where they are most needed during application. Thus, the herein disclosed slots 506 are configured to receive, allow, utilize, and/or direct such field (eddy) currents into the inner bore of the vessel to utilize a secondary field to melt the meltable material placed therein/thereon. The eddy currents inside the vessel act like a second induction coil, generating a secondary field of current which penetrates the meltable material and melts it. If a vessel is completely enclosed (e.g., without slots 506), the eddy currents generally travel only on or along an outer surface of the vessel, and do not enter the inner bore (e.g., melting portion 314) of the vessel to generate a magnetic field where the ingot/meltable material is. If the slots 506 themselves are too thin or narrow in their width, however, eddy currents can cause arcing across the slot. Accordingly, the slots 506 can be sized to substantially reduce or prevent arcing, while still allowing the wall of the vessel to substantially enclose the plunger and melt the material therein.

In an embodiment, a material may be packed between the individual fingers (e.g., within the slots 506) of the vessel 312. For example, a dielectric material like ceramic may be provided or filled in the slots 506. Such material can aid in preventing arcing and preventing any electrical connection between the fingers.

As shown in FIG. 4, each slot 506 has a length L2 extending between the first end 502 and the second end 504 of the body 500 in a longitudinal direction. The length L2 of each slot 506 may depend upon the overall length of the vessel body. Ends of each slot 506 stop before or adjacent to ends 502 and 504 without extending through end surfaces thereof, in an embodiment. For example, the slot can be formed short of the ends of the vessel to provide rigidity at either end, to reduce or substantially prevent flexing of the body. Such ends also accommodate the manifold location and the location where molten material is pressured and forced (injected) into the mold by a plunger. Each slot has a width W2 defined by a space between its parallel edges. Each slot 506 also has a height H, shown in FIG. 6, which can be defined by a thickness of the wall between the inner surface 508 and the outer surface 510.

In an embodiment, the length L2 of the slot is between approximately 150 millimeters and approximately 225 millimeters. In an embodiment, the slot has a length of approximately 175 millimeters. In an embodiment, the slot has a length L2 of approximately 212 millimeters. In an embodiment, the width W2 of the slot is between approximately 3.0 millimeters and approximately 15 millimeters. In an embodiment, the slot has a width W2 of approximately 3.175 millimeters (⅛ inches). In an embodiment, the thickness T2 of the wall is approximately 3.0 millimeters and approximately 15 millimeters. Accordingly, the height H of the slot may be substantially similar to or equal to the thickness T2 of the wall. However, the above-noted ranges of dimensions of the slot are exemplary only and not intended to be limiting or critical hereto. In an embodiment, the dimensions of the slot can be configured based on the dimensions of vessel. In an embodiment, the slot is configured to be sized such that arcing (as a result of eddy currents) between the surface 518 and 520 is substantially prevented during application of an induction field, while still allowing for directional application into the body of the vessel to the meltable material. In an embodiment, a vacuum level and/or gas pressure applied to the vessel and/or its surrounding atmosphere may also affect and/or determine the slot width W2 (and/or other slot dimensions).

In an embodiment, the wall is substantially solid through portions of its length L2 and/or thickness T2, with the exception of temperature regulating channel(s) 316 running through and the slots 506. The slots 506 form separate finger-like portions in the wall of the vessel 312. The body 500 and walls of the vessel may be created or formed using a single piece of material in which the slots 506 or gaps are formed or machined (e.g., via a wire EDM process, noted below, designed to leave a thin gap between the individual fingers). The number of fingers formed in the body 500 by the addition of slots is not intended to be limiting. In an embodiment, more than two fingers are formed. In an embodiment, ten fingers are formed. In an embodiment, fifteen fingers are formed. In an embodiment, more than ten fingers are formed.

In one embodiment, each slot 506 can include a width W2 that is approximately 0.1 mm. However, the width is not limited. The width W2 of the slots 506 or gaps is designed to be thin enough to avoid molten material from penetrating the slots 506 or gaps. The slots 506 also provide an electrical isolation between each of the fingers.

The slots 506 may be provided around the body 500 of the vessel, for example, as shown in FIG. 6. Sides of the slots 506 can be defined by parallel edges or walls, each provided on parallel planes that extend laterally in a direction perpendicular to the horizontal axis. In an embodiment, the slots 506 are formed and spaced equidistantly around the body 500 of the vessel. In an embodiment, the slots 506 and regulating channels 316 are both formed in the body 500 such that they are spaced relatively equidistant to one another. In another embodiment, the slots 506 may be formed along a top portion and a bottom portion of the vessel. The location, spacing, size, and dimensions associated with the body 500 and slots 506 is not intended to be limited to the illustrated embodiment.

The vessel allows for temperature readings of the material within melting portion/its inner bore 511. In an embodiment, a width W2 of the slots 506 can be sized to allow for insertion of a sensor or other detection device to read temperature readings of the meltable material. The width W2 of the slots 506 can also allow for observation of the meltable material within the vessel to verify that the molten material is contained (during melting), for instance.

FIG. 4 also shows that the body 500 has a flange 512 at at least one end thereof. The flange 512 is configured to secure an end of the body 500 within an injection molding apparatus and prevent movement of the body 500 relative to the injection molding apparatus. The flange 512 can prevent the body 500 from being pulled out during injection. For example, as a plunger 330 moves molten material from the body 500 and injects it into a mold, the body 500 is subject to force as the injection process takes place. As the cavity of the mold is filling via forward pressure from the plunger 330, some back pressure can be transferred to the vessel. Flange 512 aids in stabilizing and holding the vessel in the apparatus.

The flange 512 can be in the form of a protruding rim, edge, rib, or collar. It is used to strengthen the body 500, hold it in place, and/or attach it to another object in an injection molding apparatus.

The flange 512 can be provided adjacent to one of the first end 502 or the second end 504. In an embodiment, as shown in FIG. 4, the flange 512 is provided adjacent the second end 504. In an embodiment, the flange 512 is configured for insertion on a mold side of the apparatus (as opposed to the plunger side). The flange is configured for positioning and securement between a mold 340 and a transfer sleeve 350, for example.

As also shown in FIG. 4, in an embodiment, the inlets and outlets 516 can be positioned adjacent to the second end 504 of the body 500 and relative to the flange 512. For example, the inlets and outlets 516 can be manufactured based on a determination of a fluid manifold used to deliver fluid to at least the vessel.

In an embodiment, instead of a flange 512, body 500 of the vessel can include a groove. For example, the groove can be provided adjacent to the second end 504 or an end of the body 500 configured for attachment to the apparatus. A ring can be provided to sit in the groove. The combination of the ring and groove can be used to secure the vessel in a similar manner as the above-described flange.

When running fluid through the body 500, the channels can be sealed by vacuum pressure. In an embodiment, to secure an end opposite to that of the flange 512, i.e., in this case the first end 502, a receiving portion can be provided therein that is configured to receive a cap 514 for enabling vacuum sealing of ends of the regulating channels during the melting process. A cap 514, like one shown in FIG. 4, can be secured to the end 502 of the body 500 in a receiving portion, for example. The receiving portion can be in the form of a recessed pocket extending into the end surfaces at end 502. The recessed pockets can have a round, circular, or "O"-shape. Cap 514 can be formed of a substantially similar shape as the receiving portion, as shown in FIG. 4, and aligned and inserted therein. The cap 514 can be (electron-beam) welded or otherwise machined and attached at end 502 (e.g., screwed on using threads). In an embodiment, cap 514 may include holes therethrough to enable insertion of tubes for delivering fluid into the regulating channels 316 of the body 500 for temperature regulation.

FIG. 7 illustrates a plan view of a vessel 312 such as shown in FIG. 4 in an injection molding apparatus with a helically surrounding induction coil 320, in accordance with an embodiment. FIGS. 11 and 12 illustrate views of the vessel 312 shown in FIGS. 4-8 in an injection molding apparatus with a helically surrounding induction coil 320 in accordance with an embodiment. In a non-limiting embodiment, the induction coil 320 has tubes that are unevenly spaced. The vessel is secured via its flange 512 in the apparatus (not shown). Tubes from the cooling system 360 can be attached within the apparatus adjacent to the secured second end 504 of the vessel. Fluid can then be directed into the inlets and outlets 516 for regulating the body. The first end 502 can be secured via cap 514. In use, the vessel 312 is vacuum-sealed via a surrounding tube (e.g., a quartz tube) (not shown) placed under vacuum by a vacuum source, and fluid flows through the regulating channels of body 500 while meltable material is melted in inner sleeve 508 to regulate the temperature of the vessel. The body 500 is vacuum tight and not exposed to air. After the melting process, the molten material can be injected for molding by movement of the plunger 330 through the body 500.

Other embodiments of vessels with temperature regulating channel(s) therein or associated therewith having a wall for substantially enclosing a plunger tip, besides those illustrated in the Figures, are also envisioned.

This herein disclosed shot sleeve 312 is more rigid and durable than existing types of vessels, which can make any gap or spacing between the plunger tip and shot sleeve (as the plunger moves through the sleeve or vessel 312) more consistent and thus increase the life of both components by avoiding excessive wear.

Again, the body 500 of the vessel allows for the plunger tip to be aligned and stabilized as it moves through the inner surface 508, as if it is going through a fully enclosed tube while still allowing use of the magnetic field from the induction coil for melting a material, without unfavorable or undesirable shielding, which can prevent the material from reaching a temperature appropriate for casting or molding. However, the slots 506 enable receipt eddy currents within and/or into the body of the temperature-regulated vessel when an induction field (current) is applied for melting, to at least aid in melting the material.

Additionally, the disclosed vessel 312 or shot sleeve improves reliability on keeping molten material inside shot sleeve and all material being pushed into the mold cavity. It also increases the over-heat temperature of the melt to the threshold which will increase amorphous content in a cast part.

Accordingly, the above described embodiments show a vessel capable of allowing an induction field (eddy currents)

into its inner bore to melt meltable material using multiple slots or gaps, capable of substantially enclosing a plunger tip, and that can act as a shot sleeve (via its inner bore) for injecting molten material into a mold, and its method of use. In addition to the previously noted features (described with reference to vessel 312 in FIG. 4, for example) and capabilities, the herein disclosed vessel contains the alloy while it is being melted while keeping the alloy free of contamination, as well as keeping the alloy from becoming wetted to the machine. The herein disclosed vessel also acts as a mechanical channel (via its inner bore and melting portion) through which molten material can be plunged on its way into a mold and as a sliding surface for the plunger tip to move across. Thermally, the disclosed vessel provides conduction of heat between regulating liquid/coolant and the molten material. Electromagnetically, the disclosed vessel provides a conductor of electric fields (in the form of eddy currents) and magnetic fields. The disclosed vessel is also very clean, and does not introduce foreign substances to the molten alloy.

The embodiments herein can assist in reducing the amount of power absorbed by the vessel, and therefore have more power to put into the material that is being melted. More power allows the system to achieve higher melt temperatures. However, it should be noted that this does not necessarily mean that more power needs to be applied to the induction coil 320. Rather, the vessel improves the melting process by allowing a lower application of power, since a higher melt temperature can be achieved when utilizing vessels such as those depicted herein. Accordingly, the likelihood of uniformly molded and higher quality formed parts depends upon the processes performed on the material in the injection molding system and the parts used during the processes. Uniform heating of the meltable material and maintenance of temperature of molten material in such an injection molding apparatus assists in forming a uniform molded part. The configuration and design of the vessel 312 in either of the exemplary embodiments herein can improve and provide such features.

The meltable material can be received in the melt zone in any number of forms. For example, the meltable material may be provided into the melt zone in the form of an ingot (solid state), a semi-solid state, a slurry that is preheated, powder, pellets, etc. In some embodiments, a loading port (such as the illustrated example of an ingot loading port 318 in FIG. 3) may be provided as part of injection molding apparatus 300. Loading port 318 can be a separate opening or area that is provided within the machine at any number of places. In an embodiment, loading port 318 may be a pathway through one or more parts of the machine. For example, in reference to the embodiment shown in FIG. 3, the material (e.g., ingot) may be inserted in a horizontal direction into the vessel 312 by plunger 330, or may be inserted in a horizontal direction from the mold side of the injection apparatus 300 (e.g., through mold 340 and/or through an optional transfer sleeve 350 into vessel 312). In other embodiments, the meltable material can be provided into the melt zone in other manners and/or using other devices (e.g., through an opposite end of the injection apparatus).

The method of melting material can be performed using vessel 312 having features such as those disclosed with reference to body 400 in FIGS. 4-7, in cooperation with an injection molding apparatus such as apparatus 300 shown in FIG. 3. The method may include providing meltable material in a vessel 312; operating a heat source (coil 320) provided adjacent to the vessel 312 to form a molten material, and regulating a temperature of the vessel during the operating of the heat source. The body 500 of the vessel 312 is configured to utilize a magnetic field from the heat source 320 to the meltable material within the vessel 312 during the operating via allowance of eddy current into the body of the vessel through the plurality of slots 506 extending through a complete thickness of the body. The vessel 312 also includes one or more temperature regulating channels 316 therein. The regulating includes flowing a fluid in the one or more temperature regulating channels 316, e.g., during heating or melting of the material.

To perform a method of molding the molten material, the apparatus 300 may be configured to inject material into a mold 340 in a substantially horizontal direction by moving its plunger 330 in a longitudinal and/or horizontal direction, for example. Thus, the plunger 318 may be configured to push a material for melting into the body, optionally hold material during the melting process within the vessel and the melt zone, and/or move the melted material from the melting portion 314, in a substantially horizontal direction, by traveling through the vessel 312 (e.g., from right to left, towards the mold 340). As described above, the inner wall 508 of the vessel 312 is configured to accommodate movement of the tip and body of the plunger 330 as it is moved and extended therethrough.

In accordance with an embodiment, after the material is melted in the vessel 312, plunger 330 may be used to force the molten material from the vessel 312 and into a mold 340 for molding into an object, a part or a piece. In instances wherein the meltable material is an alloy, such as an amorphous alloy, the mold 340 is configured to form a molded bulk amorphous alloy object, part, or piece. Mold 340 has an inlet for receiving molten material there-through. An output of the vessel 312 (e.g., second or back end that is used for injection) and an inlet of the mold 340 can be provided in-line and on a horizontal axis such that plunger rod 330 is moved in a horizontal direction through body of the vessel 312 to inject molten material into the mold 340 via its inlet.

As previously noted, systems such as injection molding system 300 that are used to mold materials such as metals or alloys may implement a vacuum when forcing molten material into a mold or die cavity. Injection molding system 300 can further include at least one vacuum source or pump (not shown) operatively connected thereto that is configured to apply vacuum pressure to at least vessel 312 in the melt zone and to mold 340 via vacuum ports 333, shown in FIG. 3. The vacuum pressure may be applied to at least the parts of the injection molding system 300 used to melt, move or transfer, and mold the material therein. For example, the vessel 312 and plunger rod 330 may be under vacuum pressure and/or enclosed in a vacuum chamber during melting and molding processes.

In an embodiment, mold 340 is a vacuum mold that is an enclosed structure configured to regulate vacuum pressure therein when molding materials. For example, in an embodiment, vacuum mold 340 includes a first plate (also referred to as an "A" mold or "A" plate), a second plate (also referred to as a "B" mold or "B" plate) positioned adjacently (respectively) with respect to each other. The first plate and second plate generally each have a mold cavity associated therewith for molding melted material there-between. The mold cavities may include a part cavity for forming and molding a part, such as a BMG part, therein.

In an embodiment, the cavities of the mold 340 are configured to mold molten material received there-between via an optional injection sleeve or transfer sleeve 350 from the melt zone. Generally, the first plate of mold 340 may be connected to transfer sleeve 350. Transfer sleeve 350 (sometimes referred to as a shot sleeve, a cold sleeve or an injection sleeve in the art and herein) may be provided between melt zone 310 and mold 340. Transfer sleeve 350 has an opening that is configured to receive and allow transfer of the molten material there-through and into mold 340 (using plunger 330). Its opening may be provided in a horizontal direction along the horizontal axis (e.g., X axis). The transfer sleeve need not be a cold chamber. In an embodiment, at least plunger rod 330, vessel 312 (e.g., inner wall of its receiving or melting portion), and opening of the transfer sleeve 350 are provided in-line and on a horizontal axis, such that plunger rod 330 can be moved in a horizontal direction through the body of the vessel 312 in order to move the molten material from the vessel 312 and into (and subsequently through) the opening of transfer sleeve 350, and into mold 340. Transfer sleeve 350 may also be under vacuum pressure and/or enclosed in a vacuum chamber during melting and molding processes.

Molten material is pushed in a horizontal direction through transfer sleeve 350 and into the mold cavity(ies) via the inlet (e.g., in a first plate) and between the first and second plates. During molding of the material, the at least first and second plates are configured to substantially eliminate exposure of the material (e.g., amorphous alloy) therebetween, e.g., to oxygen and nitrogen. Specifically, a vacuum is applied such that atmospheric air is substantially eliminated from within the plates and their cavities. A vacuum pressure is applied to an inside of vacuum mold 340 using at least one vacuum source that is connected via vacuum lines and ports 333. For example, the vacuum pressure or level on the system can be held between $1 \times 10^{-1}$ to $1 \times 10^{-4}$ Torr during the melting and subsequent molding cycle. In another embodiment, the vacuum level is maintained between $1 \times 10^{-2}$ to about $1 \times 10^{-4}$ Torr during the melting and molding process. Of course, other pressure levels or ranges may be used, such as $1 \times 10^{-9}$ Torr to about $1 \times 10^{-3}$ Torr, and/or $1 \times 10^{-3}$ Torr to about 0.1 Torr. An ejector mechanism (not shown) is configured to eject molded (amorphous alloy) material (or the molded part) from the mold cavity between the first and second plates of mold 340. The ejection mechanism is associated with or connected to an actuation mechanism (not shown) that is configured to be actuated in order to eject the molded material or part (e.g., after first and second parts and are moved horizontally and relatively away from each other, after vacuum pressure between at least the plates is released).

Any number or types of molds may be employed in the apparatus 300. For example, any number of plates may be provided between and/or adjacent the first and second plates to form the mold. Molds known in the art as "A" series, "B" series, and/or "X" series molds, for example, may be implemented in injection molding system/apparatus 300.

A uniform heating of the material to be melted and maintenance of temperature of molten material in such an injection molding apparatus 300 assists in forming a uniform molded part. For explanatory purposes only, throughout this disclosure material to be melted is described and illustrated as being in the form of an ingot 305 that is in the form of a solid state feedstock; however, it should be noted that the material to be melted may be received in the injection molding system or apparatus 300 in a solid state, a semi-solid state, a slurry that is preheated, powder, pellets, etc., and that the form of the material is not limiting.

The method of manufacturing the herein disclosed vessel is not intended to be limiting. Any number of steps or processes may be used. For example, two or more slots can be machined or formed through the vessel wall to provide a gap or opening within the vessel after the body is formed. In an embodiment, the method includes forming a substantially tubular body 500 of a vessel 312 having a first end 502 and a second end 504 along a longitudinal direction and having an inner bore 508 therein; forming one or more temperature regulating channels 316 configured to flow a liquid within the substantially tubular body; and forming a plurality of longitudinal slots 506 extending between the first end and the second end of the substantially tubular body in the longitudinal direction and through a complete thickness T2 of the substantially tubular body. The forming of the plurality of longitudinal slots 506 is formed by a wire electric discharge machining (EDM) process.

The dimensions associated with the slots 506 need not be the same or substantially similar. In an embodiment, a first slot can have a length similar to that of the overall length of the vessel, configured to run from end to end of the vessel and therethrough, while one or more adjacent slots (e.g., on one side or on either side of the first slot) has a length that is shorter than the vessel. Of course, such an example is not limiting. The slots 506 in the vessel can be placed through the vessel body to aid in further directing eddy currents and the field towards the inner bore and melting portion of the vessel to melt material therein.

Generally, the disclosed design of the vessel is more easily manufactured. The substantially tubular design reduces machining required to produce a vessel from metal round-stock, for example. Honing or grinding the inner diameter of the inner core is made much easier by having only a small slot (e.g., rather than a large cutout extending into the walls). This makes plating easier, for instance, using chrome, where the vessel can be honed after plating.

It should be noted that the body of vessel 312 in any of the embodiments disclosed herein may be formed from any number of materials (e.g., copper, silver), include one or more coatings or layers on any of the surfaces or parts thereof, and/or configurations or designs. For example, one or more surfaces may have recesses or grooves therein. The material(s) used to form a vessel body, the material(s) to be melted, and layer(s) of material are not meant to be limiting.

The body of the vessel 312 may be formed from or include one or more materials, including a combination of materials or alloys. For example, the vessel 312 may include a metal or a combination of metals, such as one selected from the group of: stainless steel (SS), copper, copper beryllium, copper chrome, amcolloy, sialon ceramic, yttria, zirconia, chrome, titanium, and stabilized ceramic coating. In an embodiment, vessel 312 is formed from a copper alloy. In an embodiment, the vessel 312 is formed from, or has coated thereon, one or more materials that are RF insensitive.

In an embodiment, one or more coatings or layers on one or more surfaces or parts of the vessel 312 are thermal insulators thermal barriers, or electrical conductors. For example, a coating can be applied to an inner sleeve of the vessel 312 using a plating technique. The coating(s) or layer(s) on surfaces or parts need not be consistent; that is, the area of application of a coating or layering material is not limited to covering an entire surface or limited to a particular thickness or pattern. Any number and/or types of methods may be used for applying a coating material to the vessel 312 and should not be limiting. In an embodiment, a coating or layer material may include at least one of the following group: ceramic, quartz, stainless steel, titanium, chrome, copper, silver, gold, diamond-like carbon, yttria, yttria oxide, and zirconia. Deposition of these types of materials can provide surface hardness and wear resistance while at the same time remain conductive for efficient heat transfer. Application of a coating with enhanced electrical conductivity to the disclosed vessel can increase the density of the eddy currents in the boat, and thereby increase the field strength inside the boat.

Accordingly, this disclosure describes embodiments of temperature regulated vessels designed to improve melt and process temperatures for systems, as well as improve power consumption. The embodiments herein illustrate vessels that act as induction field captures that allow receipt of and can use a (secondary) magnetic field of eddy currents for melting material in a melting portion thereof while substantially enclosing sides of a plunger tip. Moreover, this disclosure provides such vessels that may be utilized in a horizontal direction for melting materials such as bulk amorphous alloys. Further, it provides a combined melting zone and shot sleeve for die casting or injection molding. Accordingly, operation of apparatuses and systems can be improved by reducing costs of the vessel and improving dimensional control of the components in the entire melt and injection path.

Although not described in great detail, the disclosed injection system may include additional parts including, but not limited to, one or more sensors, e.g., temperature sensor 362, flow meters, etc. (e.g., to monitor temperature, cooling water flow, etc.), and/or one or more controllers 364. The material to be molded (and/or melted) using any of the embodiments of the injection system as disclosed herein may include any number of materials and should not be limited. In one embodiment, the material to be melted and molded is an amorphous alloy, as described above. The temperature regulated vessel may be configured for holding amorphous alloy during application of heat or current, in accordance with an embodiment. The vessel may be configured to receive eddy currents and hold the amorphous alloy during melting, in an embodiment, and for regulating the temperature of the vessel during melting and/or application of heat or an induction field to melt the amorphous alloy. The plunger may hold the amorphous alloy during melting, and/or push or move the molten amorphous alloy from the vessel, e.g., towards a mold.

Applications of Embodiments

The presently described vessel, apparatus and methods can be used to form various parts or articles, which can be used, for example, for Yankee dryer rolls; automotive and diesel engine piston rings; pump components such as shafts, sleeves, seals, impellers, casing areas, plungers; Wankel engine components such as housing, end plate; and machine elements such as cylinder liners, pistons, valve stems and hydraulic rams. In embodiments, apparatus and methods can be used to form housings or other parts of an electronic device, such as, for example, a part of the housing or casing of the device or an electrical interconnector thereof. The apparatus and methods can also be used to manufacture portions of any consumer electronic device, such as cell phones, desktop computers, laptop computers, and/or portable music players. As used herein, an "electronic device" can refer to any electronic device, such as consumer electronic device. For example, it can be a telephone, such as a cell phone, and/or a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™) and a computer monitor. It can also be an entertainment device, including a portable DVD player, DVD player, Blu-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard driver tower housing or casing, laptop housing, laptop keyboard, laptop track pad, desktop keyboard, mouse, and speaker. The coating can also be applied to a device such as a watch or a clock.

Though the embodiments discussed herein are made with reference to FIGS. 1-7 and 11-12, those skilled in the art will readily appreciate that the detailed description given herein with respect to these Figures is for explanatory purposes only and should not be construed as limiting.

Further, it should be understood that the terms used herein, including molten alloy, molten metal, molten amorphous alloy, amorphous alloy, BMG, and the like are not intended to be limiting, but also understood to refer to bulk-solidifying amorphous alloys, or bulk metallic glasses ("BMG") that are used in the herein disclosed mold to form BMG parts.

Moreover, it should be noted that the vessel as disclosed herein may be used with a vertical system and/or positioned vertically in a vertical direction without departing from this disclosure, or at another angle. That is, the embodiments shown in the Figures are illustrative only. The system and one or more of its parts, like a vessel and/or plunger rod, may be positioned or aligned such that they move along a vertical axis, for example. One of ordinary skill in the art should further understand the method of use of such vessel and system based on the previous description.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:
1. An apparatus comprising:
 a vessel extending along a longitudinal direction and comprising:
  a substantially tubular body formed of a single piece of material and including a plurality of longitudinal slots extending through a complete thickness of the body from an outer surface to an inner bore, the body defining:
   a plunger end;
   an ejection end; and
   a melt zone extending along the longitudinal direction between the plunger end and the ejection end, wherein:
    the plurality of longitudinal slots extend from a first location inset away from the plunger end to a second location away from the ejection end;
  an induction coil configured to melt a material in the vessel, the induction coil at least partially surrounding a portion of the vessel that includes the plurality of longitudinal slots and including two end portions each having a winding spacing less than a winding spacing of a central portion; and a plunger tip positioned in the inner bore and configured to extend out of the inner bore through the ejection end to move a molten material through the melt zone and into a mold.

2. The apparatus of claim 1, wherein the vessel further comprises one or more temperature regulating channels configured to regulate a temperature of the vessel during an application of an induction field by flowing a fluid therein.

3. The apparatus of claim 2, wherein:
the one or more temperature regulating channels are positioned within the vessel between adjacent longitudinal slots.

4. The apparatus of claim 1, wherein the vessel further comprises a flange at the plunger end and configured to secure the vessel to the apparatus.

5. The apparatus of claim 1, wherein:
the vessel further comprises:
a first opening at the plunger end; and
a second opening at the ejection end; and
the first opening, the second opening, and the melt zone have substantially the same diameter.

6. The apparatus of claim 1, wherein the slots are radially disposed about a circumference of the body.

7. A method for melting amorphous alloy comprising:
positioning a meltable amorphous alloy material in a vessel comprising a substantially tubular body formed of a single piece of material and including a plurality of slots extending through a complete thickness of the body;
operating an induction source at least partially surrounding the vessel, thereby forming a molten amorphous alloy material, the induction source including a coil at least partially surrounding the slotted portion and including two end portions each having a winding spacing less than a winding spacing of a central portion;
flowing a fluid in one or more temperature regulating channels within the vessel to regulate a temperature of the vessel during the operating of the induction source; and
moving a plunger through the vessel and into a transfer sleeve to push the molten amorphous alloy material into a mold coupled to the transfer sleeve.

8. The method of claim 7, further comprising, while operating the induction source, preventing the meltable material from escaping a melt zone of the vessel by contacting the meltable material with the plunger.

9. The method of claim 7, wherein:
the vessel is positioned along a horizontal axis; and
moving the plunger comprises moving the plunger in a horizontal direction towards the mold.

10. The method of claim 9, further comprising pressurizing the molten material in the mold to form a BMG part.

11. An apparatus comprising:
a vessel extending along a longitudinal direction from a first end of the vessel to a second end of the vessel and including:
a monolithic metal structure defining:
a first continuous annular portion at the first end;
a second continuous annular portion at the second end;
a segmented portion positioned between the first and second continuous annular portions and having a plurality of longitudinal slots extending through a complete thickness of the monolithic metal structure; and
an inner bore extending from a first opening at the first end of the vessel to a second opening at the second end of the vessel, the first and second openings having a same diameter;
an induction coil at least partially surrounding the vessel and configured to induce eddy currents along the inner bore of the monolithic metal structure, wherein the induction coil at least partially surrounds the segmented portion and includes two end portions each having a winding spacing less than a winding spacing of a central portion; and
a plunger tip positioned in the inner bore and configured to extend through the inner bore to move a molten material through the melt zone and into a mold.

12. The apparatus of claim 11, wherein the plurality of slots are filled with a dielectric material.

13. The apparatus of claim 12, wherein the dielectric material is a ceramic material.

14. The apparatus of claim 11 wherein the inner bore is defined at least in part by:
a first continuous annular wall at the first end of the monolithic metal structure; and
a second continuous annular wall at the second end of the monolithic metal structure.

* * * * *

UNITED STATES PATENT AND TRADEMARK OFFICE
CERTIFICATE OF CORRECTION

Page 1 of 1

PATENT NO. : 9,873,151 B2
APPLICATION NO. : 14/572066
DATED : January 23, 2018
INVENTOR(S) : Sean Timothy O'Keeffe et al.

It is certified that error appears in the above-identified patent and that said Letters Patent is hereby corrected as shown below:

Column 32, (Line 63) Claim 1, Line 15:
After "location" please delete "inset"

Signed and Sealed this
Third Day of April, 2018

Andrei Iancu
*Director of the United States Patent and Trademark Office*